(12) United States Patent
Ball

(10) Patent No.: US 6,659,020 B1
(45) Date of Patent: Dec. 9, 2003

(54) EXTRUSION

(75) Inventor: Graeme Matthew Ball, Victoria (AU)

(73) Assignee: Starlon Pty Ltd (AU)

( * ) Notice: Subject to any disclaimer, the term of this patent is extended or adjusted under 35 U.S.C. 154(b) by 0 days.

(21) Appl. No.: 09/700,892

(22) PCT Filed: May 20, 1999

(86) PCT No.: PCT/AU99/00377

§ 371 (c)(1),
(2), (4) Date: Jan. 12, 2001

(87) PCT Pub. No.: WO99/59798

PCT Pub. Date: Nov. 25, 1999

(30) Foreign Application Priority Data

May 20, 1998 (AU) ............................................ PP 3618

(51) Int. Cl.[7] .............................................. B65D 19/38
(52) U.S. Cl. .................................... 108/57.28; 428/4 C
(58) Field of Search ................................ 425/4 C, 144, 425/113, 327, 328, 371, 370, 394, 396, 404, DIG. 44, 817 C; 264/264; 156/137, 138, 139, 140, 141, 500; 108/57.28

(56) References Cited

U.S. PATENT DOCUMENTS

| | | |
|---|---|---|
| 3,911,182 A | 10/1975 | Lieberman |
| 4,017,245 A | 4/1977 | Lang |
| 4,128,369 A | 12/1978 | Kemerer et al. |
| 5,505,599 A * | 4/1996 | Kemerer et al. |
| 5,511,964 A | 4/1996 | Hegler et al. |
| 5,687,652 A | 11/1997 | Ruma |

FOREIGN PATENT DOCUMENTS

GB  2 271 981  10/1993

* cited by examiner

Primary Examiner—Jose V. Chen
(74) Attorney, Agent, or Firm—Cohen & Grigsby, P.C.

(57) ABSTRACT

An apparatus and method of producing an elongate calibrated extrusion of a formable material. The formable material most suitably comprises a thermoplastics polymer having an outer skin (94) and a foamed core (91). It may be formed using an extrusion apparatus (100) having an extruder (101) and a co-extrusion die (104) which delivers the extrudate between opposed sizing conveyors (106). These travel at a speed suitable to allow them to continuously take up the flowable extrudate. The flowable extrudate is caused to adhere sufficiently to the surface of the sizing conveyers in order to cause the extrudate to maintain its shape. The extrudate is detached from the recirculating sizing conveyors after it has solidified sufficiently to exhibit the desire dimensional accuracy. Produce exemplified includes relatively high Young's Modulus composite product fabricated into materials handling pallets.

49 Claims, 8 Drawing Sheets

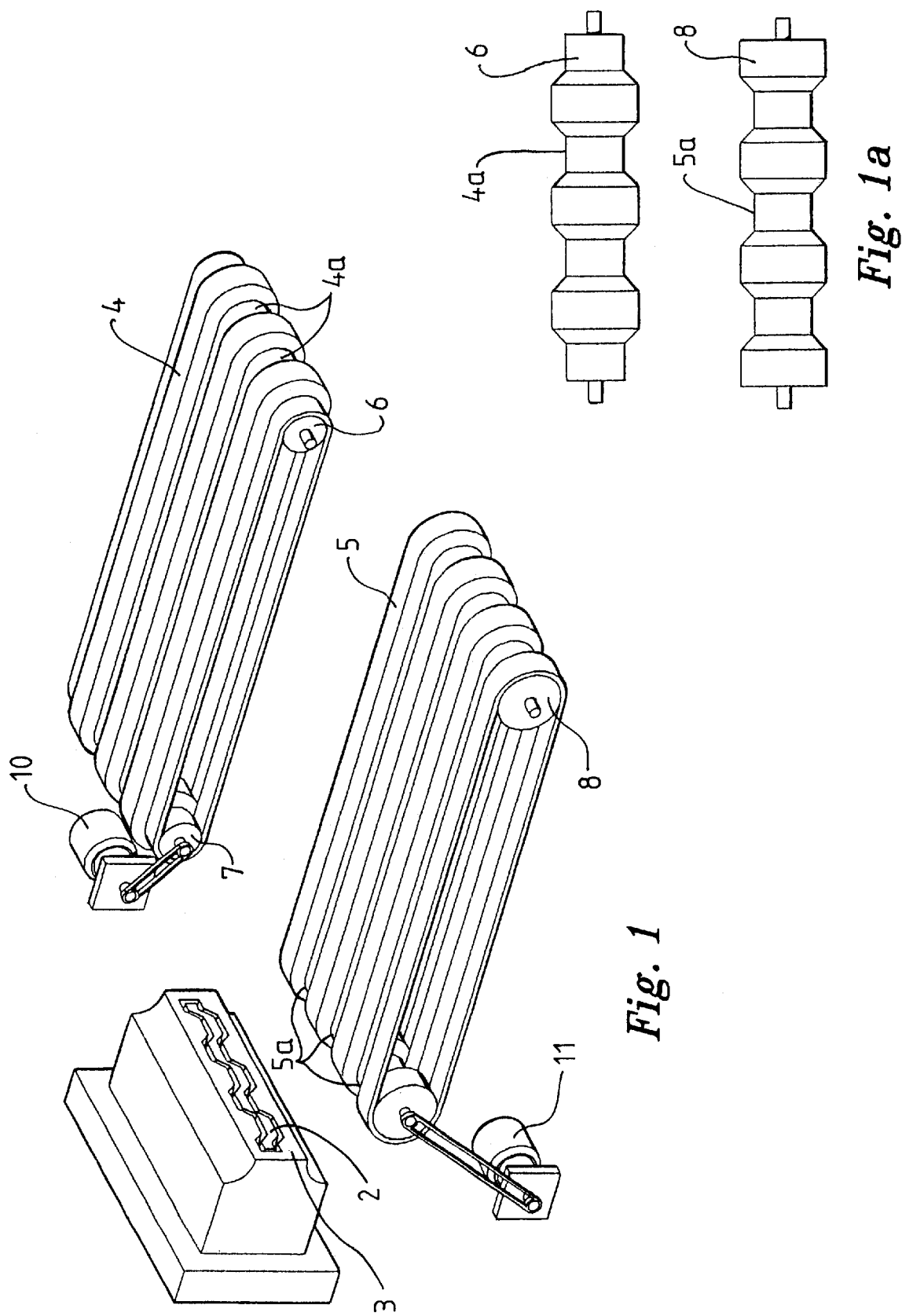

EXTRUSION

BACKGROUND OF THE INVENTION

1. Field of the Invention

The invention relates to extrusion and calibrating or sizing methods for formable materials. Also in a particular non-limiting aspect, it relates to products including materials which have been manufactured according to these extrusion and calibration methods.

2. Background of the Invention

There are a number of known methods of calibrating or sizing a thermoplastics melt, where applicable, after it leaves the extrusion die or orifice. Without some form of sizing, the extruded melt would generally deform in a manner which would make the extrudate unacceptable in shape or dimensions, unless the application is undemanding with regard to its dimensional accuracy or the plastics raw material is one which holds its hot shape quite well, for example, flexible polyvinyl chloride (PVC). This property is known as melt strength or hot strength. Details of common methods of sizing or calibration of pipes and profiles are given in a chapter devoted to that subject in the book, Extrusion Dies for Plastics and Rubber by Walter Michaeli, Hanser Publishers Second Edition 1992. As this invention is particularly directed to methods involving the production of calibrated extrusions having one or more ribs which may serve to provide strength, the term profile as used throughout the specification and claims relates to the production of extrusions having one or more ribs. The one or more ribs may take the form of one or more corrugations.

For products that are tubular there are a number of known methods of sizing or calibrating the hot viscous extrudate, the two most common being internal pressure sizing and external vacuum sizing, these being often referred to as simply internal or external sizing or calibration. In the case of internal pressure sizing, air pressure is used to inflate the molten extrudate to force its external surface against a fixed cooled internal tubular surface in order to size or calibrate the extrudate. With vacuum sizing the reverse applies where vacuum is employed to pull the external surface of the molten extrudate to a cooled surface or surfaces and thus to size or calibrate the extrudate. Sometimes there is also direct contact of the hot extrudate with water between, for example, a series of cooled plates with positive air pressure inside the extrudate or vacuum applied externally.

A further known method of sizing an extrudate is that of drawing the molten extrudate through a series of fixed plates which may be water or air cooled and thus assist in the extrudate retaining its desired shape. This method again is only applicable to those plastics which exhibit good melt strength and relatively low shrinkage during cooling, for example, PVC ABS, celluosic materials, to name only some. Such a method is not readily applicable to those materials which have neither high melt viscosity or good melt strength, for example, polyethylene (PE), polyethylene terephthalate (PET) or polypropylene (PP), to name just three common thermoplastics materials. Hence these materials are not frequently employed to manufacture extruded profiles.

Another known method for making somewhat more complex generally essentially tubular shapes from thermoplastics materials employing extrusion sizing, involves the use of a series of generally water cooled female dies mounted on a pair of opposing caterpillar tracks. Michaeli chapter 11.1.6 refers to this process as "movable calibrators". "If the calibrators move continuously with the extrudate, profiles with a changing cross section (in the direction of the take-up) can be produced." The matching female dies mounted on caterpillar tracks usually above and below the extrudate, accept the molten extrudate which is usually expanded with internal air pressure to the dies, where it is then cooled to shape. An example of this technique is the production of corrugated drainage pipe. A similar technique has been employed for manufacture of blow moulded containers. This too employs matching female dies generally mounted on caterpillar tracks or other longitudinally movable means, to produce hollow bodies rather like a string of sausages.

Many extruded profiles or sections also have vacuum calibration or sizing applied to them in order to have them conform to the required shape and dimensions. A common example of this is the extrusion of Window frame profiles, generally from rigid (unplasticised) PVC.

All of these methods have the objective of enveloping the lateral outside directions of the extrudate (i.e., the cross sectional shape of the section lateral to the direction of extrusion) and providing contact by pressure or suction of the outside surfaces of the molten extrudate with an appropriately shaped means of cooling, for a time which is sufficient to cool the surfaces of that extrudate to an extent that it will maintain its shape and dimensions to an acceptable degree. In other words to achieve and maintain the desired dimensional accuracy.

In sheet extrusion the melt generally passes through a multi-roll stack which somewhat cools the product and makes its thickness uniform. Further functions of this stack are to impart a surface finish to the extrudate which may be gloss, matte, embossed or otherwise textured. In some instances another sheet or film may be laminated to the extrudate through the roll stack. The method of cooling the sheet after the roll stack is generally air cooling.

It is also known to produce corrugated sheet by the extrusion process from thermoplastics materials such as unplasticised (rigid) PVC, polycarbonate, acrylic etc. Some of these methods involve drawing a hot extruded sheet over rolls or bosses in order to form the corrugations in the longitudinal direction with respect to the direction of extrusion. Another known method involves rolling in the corrugations in the lateral direction with respect to the direction of extrusion. These methods are generally only applicable to plastics materials which have a relatively high melt viscosity and/or good melt strength.

The use of belts to form a plastics product in a dynamic manner is known to those skilled in the art. Potchen et al in U.S. Pat. No. 2,866,730 uses flat metallic continuous belts to form laminated panels employing polyurethane foam. Wood metal or other panels previously produced by other methods are fed into the machine of this invention to form the outer skins of the laminated panels. This avoids the liquid, foaming polyurethane with its adhesive tendencies, coming in contact with the flat belts (not profiled). However, the use of a separate skin formation step with subsequent lamination introduces complexity and cost.

Kornilak in U.S. Pat. No. 3,914084 in a process used to produce profiled foam products from thermosetting materials, uses thin profiled rubber continuous belts. These profiled belts only have the required profile shape when they are travelling along a straight run and are deformed to a more planar configuration during the action of passing around the drive and driven rolls. The thin profiled rubber belts are supported by a series of matching profiled dies mounted on caterpillar tracks. Release agents are used in order to prevent the plastics materials from adhering to the rubber belts.

Kemerer et al in U.S. Pat. No. 4,128,369 disclose a process for making panels from thermoplastics materials having three-dimensional patterns and surface textures. In this process opposing flat, thin, steel belts have cured silicone elastomeric continuous forms adhered to those opposing flat thin steel belts in order to form a complementary pair of continuous or occasionally separated silicone elastomeric moulds. Silicone RTV's in their cured state are known for their release properties with hot thermoplastics materials and indeed are used in the plastics industry as coatings on rolls, etc. which come in contact with hot extrudates in order to avoid adhesion to those rolls, etc. Again the elastomeric moulds must deform in order to pass around the drive and driven rolls, but in a different manner to that of Kornilak, because in this instance the moulds are adhered to the steel belts. Kemerer et al in U.S. Pat. No. 4,128,369 Column 4, discuss a process in which pre-foamed polymer particles are fed into a channel defined between endless belts and there further foamed with steam. Kemerer et al distinguish their process from those employing foam processing in the following manner, "Such foam processing in which the shaping of the product depends upon the internal foaming pressure of the expanding material is quite different from the continuous ribbon feeding and shaping steps of the present invention in which the final shaping of the product is produced by mechanically rolling continuous travelling flexible cooled moulds against opposite surfaces of the thermoplastics material." Furthermore, Kemerer et al in U.S. Pat. No. 4,128,369 in Column 20 point to the importance for the extruded ribbon to completely fill the casting channel in order to produce the desired pattern and surface texture definition and advocate the use of a "moderate bulge" of excess material before the nip region of his moulds. Such a method can be expected to have significant disadvantages when applied to the extrusion of the low melt viscosity and low melt strength polymers particularly in relation to profiled extrusions having outer skins of different material in the core of the extrusion. This is because it can be expected that there would be difficulties relating to the milling action associated with such a bulge in maintaining consistency of the profile, the skin thickness and/or other properties.

In later developments, Kemerer et al in U.S. Pat. No. 4,290,248 and 5,505,599 continue with the use of such silicone rubber moulds, but have different compositions of the backing belts amongst other matters, compared with Kemerer et al in U.S. Pat. No. 4,128,369. In none of the specifications is there any teaching for other than flat backing belts or for formed metal belts or segments. Nor is there any teaching of the desirability of having the extrudate initially adhere to the profiled belts prior to those belts being peeled away from the extrudate. Indeed in Ketnerer U.S. Pat. Nos. 4,128,369, 4,290,248 or 5,505,599, the extrudate never comes into contact with the backing belts regardless of the composition of those belts and merely contacts the cured silicone surfaces.

Tippman in U.S. Pat. No. 4,149,840 employs articulated platens i.e., forms on a caterpillar track, covered with cast polyurethane rubber belts which have a continuous mould form. This creates a continuous cavity between opposing belts in which polyurethane foam is continually formed. Once again the process could not function satisfactorily if the foaming polyurethane were to initially adhere to the cast polyurethane rubber belts. Polyurethanes in their liquid form are very aggressive adhesives which would not readily release upon setting and steps would have to be taken to prevent adhesion from occurring in this invention.

Lang, U.S. Pat. No. 4,017,245 teaches the use of flat, thin steel belts and after having cooled the surfaces which are in contact with the belts to an appropriate extent, expansion of the foaming extrudate is allowed to occur in a controlled manner through the widening of the gap between those belts. An object is to chill the surfaces and thus prevent foaming occurring on these outermost surfaces thus having essentially solid skin material. A plurality of small closely spaced nozzles or dies are employed in order to maintain a sufficiently high-pressure to present forming of the expandable extrudate occurring before leaving the die and to have a better control of the product shape. Upon exit from the die the individually formed strands are immediately contacted by a pair of flat temperature controlled (chilled), thin metal driven endless belts which converge for some distance and cause the strands to join together into a single product with a chilled skin to prevent foaming at those surfaces and to give the desired smooth surface skin. In column 5 of Lang, 4,017,245 specific mention is made of the pressure exerted by the convergence of the belts and also by the force of expansion of the foaming material, having the purpose of collapsing any cell structure in order to form a substantially non-cellular skin. Where side members are used and for reasons of design constraints there is not the same opportunity to chill those surfaces, non-sticking coating materials are employed such as Teflon. In Lang, 4,017245 there is no teaching of the use of mesh belts nor are the belts shaped, nor is the resultant product a profiled shape and Lang employs special means which avoid adhesion of the foaming extrudate to his belts.

Naohara et al in U.S. Patent No. 4,589,845 teaches the use of a single flat woven wire mesh belt as the support for polyolefin sheet, previously produced in a process outside the scope of this specification. The sheet product employed already incorporates the ingredients for cross-linking and foaming and an object of using such belts is to allow more even heating of the polyolefin sheet in order to more uniformly bring about such cross linking and foaming. Naohara et al in U.S. Pat. No. 4,589,845 specifically addresses the difficulty of removal of the then cross-linked sheet, where intrusion of the sheet into the openings of the wire mesh has occurred. Naohara et al in U.S. Pat. No. 4,589,845 in Column 3, specifically notes that "balance weave" amongst a number of weaves "are ill-suited because of their roughness of the surfaces which causes intrusion of the sheet into the wire net, resulting in the reduction of releasability of the sheet from the net and the formation of impression on the surfaces of the product." Naohara et al in U.S. Pat. No. 4,589,845 Column 6 teaches the use of release agents such as silicones, PTFE, etc. in order to improve releasability. It is an embodiment of Naohara et al in U.S. Pat. No. 4,589,845 that the belts are flat, thus not formed to a profile shape. Furthermore Naohara, et al in U.S. Pat. No. 4,589,845 are not using the process for the sizing or calibration of a hot extrudate and indeed do not employ complementary belts, thus making no attempt to confine or size the section shape.

Sprague in U.S. Pat. No. 3,961,875 also uses a single mesh belt in flat form as a conveyor belt to support an elastomeric sheet, which is capable of foaming and cross-linking through the application of heat in passing through an oven. The mesh size and type of weave is different to that of Naohara et al in U.S. Pat. No. 4,589,845, and it is an object of Sprague in U.S. Pat. No. 3,961,875 for the elastomeric material to drape through the weave in a controlled manner and in so doing is prevented from extending completely through and wrapping around the wires by elongated strips inserted through the lateral wire spirals of the mesh. In Column 4 of Sprague U.S. Pat. No. 3,961,875 he notes that previously proposed apparatus without such elongated strips could permit complete drooping of the elastomeric material through the belt with consequent unsatisfactory results. As with Naohara et al in U.S. Pat. No. 4,589,845, Sprague in 3,961,875 is not using the process for the sizing or calibration of a profiled hot extrudate and indeed is not even employing complementary belts, thus again making no attempt to confine the section shape, this being a necessary feature of sizing.

There have been a considerable number of patents which teach the use of coextrusion techniques to apply a skin of the same thermoplastics polymer (or a compatible polymer) as a coating or skin over a foamed thermoplastics substrate.

Ono et al in U.S. Pat. No. 3,855,376 employs a coating or a sandwich of unfoamed polymeric material over a foamed polymeric material in order to reduce the weight of the product and to enhance its rigidity, particularly with respect to its weight. Ono et al produce a structural material which also has enhanced impact strength because of its (in general) sandwiched foam, which has a greater ability to absorb such stress. Ono et al state that the method of foaming is via the pressure being removed from the outer (unfoamed) layers thus allowing the inner layer to foam to an extent that is controlled by "thickness regulating members". In Column 4 of this specification, ". . . . the thickness of said structural material is regulated by the thickness regulating members for example thickness regulating rolls, so that the shaping of the surface and the regulation of the thickness of the structural material can be achieved". There is no teaching of a sizing or calibration device in this specification and certainly such "thickness regulating rolls" would not be considered to constitute a sizing or calibration device, by those skilled in the art. Ono et al in FIG. 2 show a section with square return edges of similar thickness and constitution to that of the base of that same section. In Column 4 it is stated "FIG 2 shows another embodiment of die structural material which is formed into a specific shape . . .". In the absence of any teaching of any other method of controlling the shape of a molten extrudate after exit from the die, excepting that of the thickness regulating rolls, it can only be assumed that Ono et al are referring to thermo-forming the product illustrated in their FIG. 2, from sheet made under their invention, away from the extrusion line, because it would be very difficult to produce such a shape by direct extrusion employing the teaching of that Specification.

Ono et al in U.S. Pat. No. 3,855,376, teaches the structural benefits of employing a skin material of unfoamed polymeric material as a coating over a compatible foamed substrate and provides examples which quantify those benefits. Ono U.S. Pat. No. 3,855,376 contains no teaching, about the considerably enhanced structural benefits available through employing a reinforced thermoplastics skin material which itself has at least double the Young's Modulus of its non-reinforced counterpart and which has the effect of increasing the Young's Modulus of the composite structure by at least fourfold and preferably at least sixfold that of the foamed material.

Kasai et al in U.S. Pat. No. 3,863,000 teaches a method of extrusion which "facilitates the formation of skins of about 1 mm thickness" and having an interior of "rugby ball shaped" cells of generally greater than 5 mm diameter which have their long axes generally perpendicular to the outer skins. These factors lead to a claimed enhanced Flexural Modulus compared with that of foams of the same density without those features. Considerable results are given regarding the Modulus at various densities and for various polymers to demonstrate this claim.

Buckler et al in U.S. Pat. No. 4,101,050, employ fillers in polystyrene compounds, which are then used as one or more layers in a co-extruded laminate with unfilled polystyrene. Under Buckler et al in U.S. Pat. No. 4,101,050, a layer of the co-extruded sheet may be foamed. Buckler et al in U.S. Pat. No. 4,101,050, Column 4, "It has been found that such foamed blends can be readily laminated with one or more layers of polystyrene, eg by co-extrusion to form sheets having an advantageous combination of rigidity and toughness characteristics, together with very light weight." There is no teaching in Buckler et al in U.S. Pat. No. 4,101,050 of methods to produce a product other than sheet and thus there is no mention of, or requirement to, employ sizing or calibration devices.

Suzuki in U.S. Pat. No. 4,889,669 discloses a process in which a skin(s) of filled thermoplastics materials is co-extruded over a thermoplastics material containing foaming agents. A rather similar wide range of fillers is disclosed to that in Buckler et al in U.S. Pat. No. 4,101,050, however with preference for talc, mica and calcium carbonate, whereas Buckler expressed no preference. The stated object in employing a filled thermoplastic skin in Suzuki U.S. Pat. No. 4,889,669 is to prevent wave-like deformation resulting from expansion of the foamable thermoplastics material, when the pressure is released upon exit from the die. Column 1 Suzuki in U.S. Pat. No. 4,889,669, gives details of this "corrugation phenomenon" which occurs when extruding a foaming extrudate through a slit die. In discussion of the prior art it is stated "However, the deformation in the width direction due to the limitation in the width direction cannot be prevented." Further Suzuki in U.S. Pat. No. 4,889,669 states, . . . an object of the present invention is to provide a method whereby the corrugation can be effectively prevented without the use of a special apparatus Such "special apparatus" includes the use of devices which constrain the expanding extrudate such as a sizing die. Thus Suzuki in U.S. Pat. No. 4,889,669 does not teach the use of complementary belts, bands or segments in a sizing arrangement nor envisage the production of a profiled shape.

Suzuki, U.S. Pat. No. 4,889,669, Column 4 states that the unfoamed layer containing the filler provides a high specific modulus and a high flexural stress to the surface of the foamed article, but provides no teaching on the quantum of these effects. Likewise there is no teaching of whether that increase in modulus is in terms which are relative to the modulus of the foamed layer, an unfoamed layer without filler or the composite. Suzuki U.S. Pat. No. 4,889,669 also contains no quantification of the structural benefits available through employing a reinforced thermoplastics skin material. Furthermore Suzuki in U.S. Pat. No. 4,889,669 does not discuss or teach any sizing or calibration method, other than to state that sizing methods under Japanese Patent Application Nos. 25068/73 and 65771/79 are unsuitable for practical use. These Japanese Patent Application Nos. 25068/73 and 65771/79 relate to thermoplastics foam extrusion. It is well known by those skilled in the art, to use skin(s) which are relatively rigid over a foamed or otherwise expanded substrate for reasons of durability or to make relatively rigid panels etc. from an otherwise structurally weak substrate material, eg polyester fiberglass over rigid polyurethane foam or fibre reinforced epoxy over polystyrene foam. These examples involve the use of multiple processes to manufacture the reinforced skin panel or the foam substrate or each one, in a separate process to that of making the foamed substrate in order to produce the laminate. Sometimes there may also be involved yet another material, eg an adhesive substance, in order to create such a laminate. This all leads to increased cost and, as detailed in Ono et al in U.S. Pat. No. 3,855,376, delamination may occur with time. Additionally the bond strength which can be attained with eg the polyolefins, through such methods is relatively poor. The methods lack the elegance and efficiency of a unitary process such as the co-extrusion of a reinforced thermoplastics skin over a foamed thermoplastics substrate.

It is also known to draw through some form of shaping die, fibrous reinforcements of a continuous form, through a plastics material which is either liquefied or has been melted. The object is generally that of producing continuous lengths of a shaped section in a reinforced plastics material which is hardened either by chemical reaction, by cooling to below the melting point, or by other means. The most common reinforcement employed is glass fibre in the form of rovings, woven or non-woven tape, or a prepreg. containing such forms of fibre glass. Moyer in U.S. Pat. No. 3,993,726 teaches a method of making extremely rigid products by employing pre-treated fibre glass rovings in a continuous form and passing such rovings through a thermoplastics extrusion die and subsequently through a cooling and sizing die, to produce continuous length articles. Hawley U.S. Pat. No. 4,439,387 employs a thermoplastics extrusion die as the means to coat continuous form fibrous reinforcements with a thermoplastics material. Balazek, U.S. Pat. No. 4,938,823 firstly makes a preform of a continuous form of fibrous reinforcement employing liquid thermosetting materials and then passes this continuous preform through a thermoplastics extrusion die to coat that preform with a thermoplastics material and bond together the various materials. Augustine U.S. Pat. No. 5,277,566 discloses a method of impregnating fibrous reinforcements in continuous form with thermoplastics materials by passing them through an extrusion die to make circular, oval or rectangular sections from such. Takamoto U.S. Pat. No. 5,665,295 discloses a method which impregnates fibre reinforced skin layers in a liquid thermosetting resin over a foamed core material to make lightweight composite materials in which thermoplastics extrusion is not directly involved. Lin et al U.S. Pat. No. 5,866,051 disclose methods which employ continuous strip forms of pre-impregnated fibrous reinforcement and pass multiple such strips through the die of a thermoplastics extruder in order to produce continuous lengths of strong composite materials. It is disclosed that the plastics materials employed for impregnating the fibrous reinforcement strips to make the prepreg, may be of a thermoplastics or a thermosetting nature and that the foam may also be thermoplastics or thermosetting, thus the invention does not only envisage the manufacture of moldable materials. In the absence of any disclosure of the method of manufacture of such prepreg strips it is presumed that these strips could be made in a manner disclosed in U.S. Pat. Nos. 3,993,726, 4,439,387 or 4,938,823.

Each of the specifications in the previous paragraph involve the use of fibre reinforcing materials in which the fibres are continuous or the strip, tape or other fibrous matrix is made continuous by an appropriate process. Each of those specifications depend upon such a continuous form of supply of the fibrous reinforcing member for their processes to operate. In each case the continuous form of supply of the reinforcing member is fed into and through a die which shapes the product, in most instances a thermoplastics extrusion die, which incorporates the other ingredients to form a continuous reinforced composite material exhibiting improved rigidity. None of these specifications disclose the use of co-extrusion to apply reinforced thermoplastics skins over a thermoplastics core, but rather they teach away from such a procedure through the necessary use of a continuous form of such fibrous reinforcing members in order that there is both a continuous supply of such to the die and so that it is sufficiently strong to be pulled through the extrusion die. For this latter reason such processes are frequently referred to as "Pultrusion". Additionally none of those processes disclose a dynamic method of sizing an extrudate.

Hitherto it has been considered to be difficult to manufacture a section or profiled continuous shape requiring reasonable dimensional tolerances, by extrusion methods, from those relatively low viscosity materials such as the polyolefins, PET or its copolymers, polyanuides, etc. If such an extrusion was also required to be in a non-cross linked foam from those same relatively low viscosity and low melt strength materials, this would have added to those difficulties.

It is well known to use reinforcing fibres in the manufacture of materials handling pallets in particular to increase their load handling capacity. In general when such reinforcement is employed eg in an injection moulded pallet of unitary construction, it is necessary to add such reinforcement to the bulk of the thermoplastics molding material and may constitute 10% of the mass of the raw materials employed. This is expensive and wasteful as the reinforcement is only required in specific areas of a pallet.

DISCLOSURE OF THE INVENTION

In one aspect the invention provides a method of producing an elongate calibrated extrusion of a formable material particularly but not exclusively low melt viscosity and/or low melt strength thermoplastics polymers including the steps of: extruding the formable material to form a flowable extrudate, directing the flowable extrudate through a calibrator having an internal forming surface which moves at sufficient speed to allow it to continuously take up the flowable extrudate, causing the flowable extrudate to adhere sufficiently to the internal forming surface to maintain the shape of the flowable extrudate in conformance with the forming surface until the flowable extrudate has solidified sufficiently to maintain its shape without external support, and detaching the solidified extrudate from the internal forming surface. Suitably the calibrator includes opposed conveyors which jointly provide at least part of the internal forming surface. The extrudate may be planar on one or more surfaces, however, most suitably the extrudate has a profiled cross section. It may have a corrugated cross section defining one or more of its surfaces. However, most suitable the extrudate has a profiled cross section. It may have a corrugated cross section defining one or more of its surfaces. The one or more ribs forming the profile may extend in the direction of travel of the internal foaming surfaces or may extend transversally to the direction of travel of the extrudate.

In preferred aspects the invention is applicable to the extrusion of plastics materials, particularly thermoplastics. It may be particularly applicable to the extrusion of materials having low melt viscosity and/or poor melt strength. Examples of such materials, include: PP, PE, PET, PBT and their copolymers, polyarnides and mixtures or composites of these materials including laminated and/or foamed constructions employing one or more thermoplastics materials to produce a composite structure as the extruded product of the invention.

The invention may also be applicable to extrudable non-thermoplastic materials which are formable immediately after extrusion but which set or cure to form a relatively fixed shape after a short time. The setting may occur as a result of a chemical or physical reaction or change of state, for example, eg the cross linking of a polymer, hydration of a compound such as plaster of Paris or solidification upon cooling.

Generally, the invention may be particularly suitable for processing thermoplastics materials having melt viscosities as low as an IV of 65 for PET, PBT or their copolymers, or a melt index of 100 for polyolefins or any other thermoplastics. These values could even be as low as an IV of 50 for PET etc. or a melt index below 300 for polyolefins or any other thermoplastics.

The method of the invention is suited to a large range of materials of wide ranging viscosities, including those materials with low viscosity and/or poor melt strength which could not in general be previously processed into non-crosslinked profiles exhibiting good dimensional tolerance.

The methods provided by this invention involve the use of dynamic continuous forms of calibration as opposed to the above described static calibration methods or the "movable calibrators" used, for example, for production of corrugated drainage pipe. Additionally the continuous dynamic calibrators of this invention may be both male and female in form, when viewed in a section cut through laterally to the direction of extrusion whilst for drainage pipe production or blow moulding the dies are each female. In the methods of this invention the calibration means suitably move continuously together with the extrudate, until that extrudate reaches a state where its shape is sufficiently fixed. Furthermore as opposed to the above known methods, it is a desirable feature of the current invention to have the extrudate initially adhere to the continuous dynamic calibrators. The continuous dynamic calibration is preferably performed with internal forming surfaces in the form of opposed belts, bands or multiple segments which are appropriately shaped and disposed on either side, for example, generally above and below or in many cases, surrounding the extrudate.

Using a form of wire mesh belts or chain mesh which permits sufficient movement between the links in the longitudinal direction, simulates stretch in that longitudinal direction because the spirals are actually slipping closer together or further apart from each other when passing around a roll thus enabling it to retain its profiled shape. The belts are preferably endless recirculating belts. An example of a form of wire mesh belt which has been found applicable to this invention is known as "balanced weave" and consists of somewhat flattened wire spirals in both right hand and left hand configurations (hence being "balanced") and the left hand and right hand spirals are alternately connected (linked) by a crimped wire which is "locked" at each end thus permitting substantial "stretch" to only occur in the longitudinal direction. The openings projected between the wire centres of this mesh may be as large as 6 mm×4.5 mm with wire 1.25 mm diameter but preferably are smaller. By the use of normal metal working techniques it is possible to form those belts in the width direction to a shape which they retain whether they are passing around the driver and driven rolls or being drawn between those rolls. It is important that the wire mesh belt is locked against transverse stretch. Otherwise, the profile shape could be unacceptably deformed by the tension applied between the driver and driven rolls. Welding is an example of a suitable method of so locking. If there are complementary shaped belts disposed on either side of a molten extrudate, which is expanding with internal pressure from either a foaming agent or other internal gas pressure, the extrudate can be forced to adhere to those belts in a controlled manner, and to conform to the shape of the space between those complementary belts, thus assuming the shape and texture of those belts. If adherence is insufficient for the extrudate to exhibit good sizing, it can be assisted by any appropriate means such as heating the belts before coming into contact with the melt. Likewise sandblasting or otherwise roughening the surface of the belts may be employed to assist in obtaining sufficient initial adherence. By driving those belts at a speed appropriate to the exit speed of the extrudate from the extrusion die, the belts can also act as the haul-off for the product. That extrudate may be cooled either partially or completely whilst still being retained by the belts, until those belts are peeled away from the extrudate via the action of those belts passing around the exit rolls. The effect of the extrudate being initially sufficiently adhered to those belts performs a similar function to that of the vacuum in vacuum calibration of an extruded profile or section, i.e., in vacuum calibration the shrinkage forces during cooling are desirably resisted by the vacuum to an extent which is sufficient to retain the extrudate against the cooled surface(s) to a sufficient extent to attain the required dimensional tolerances for the given product. In this invention, in a similar manner to that of the vacuum, the initial adherence of the extrudate surface to the belts or bands may be controlled to sufficiently hold the surfaces against the shrinkage forces to retain the shape to a sufficient extent to attain the required dimensional tolerance without the complexity and expense which might otherwise be required where vacuum is used. This is generally assisted by internal pressure from foaming or by other means of obviating the formation of a partial vacuum internally in the extrudate through shrinkage of the plastics material during cooling.

The weight of the belts between the driven and the driver rolls can be such that the belt under gravitational force could cause deformation of the extrudate whilst it is still in an insufficiently cooled state to resist that deformation. Magnets, either permanent or electro-magnets, may be employed in appropriate positions to resist such gravitational force on the belts or bands and maintain their contact against appropriately shaped belt support plates or rolls. It is envisaged that there could be instances where it would be desirable to employ such magnets on either side of the extrudate, for example, if shrinkage forces on a given extrudate tend to act in a manner which changes the space of the profile shape or size between the complementary belts and hence limits the sizing ability for the profiled product. In a similar manner for specialized applications vacuum could be employed over the whole of the belt system to cause the extrudate to support the belts against gravity and other forces which likewise tend to limit the sizing ability for the profiled product. Such vacuum would complement the adherence effect.

For a composite section thickness generally greater than 6 mm, it is useful to contain the expanding extrudate in all lateral directions against any forces of expansion. This enables the production of an acceptable edge on the extrudate which may obviate any need for trimming. A non-trimmed extrudate enables the high modulus coating to form a complete lateral surround of the profiled shape without exposing the core material. The high modulus coating is thus better able to protect the foamed core against possible damage. More importantly, by containing any forces of expansion the profile shape may be more "sharp" and its dimensions more accurate and true to the profile of the formed belts over the whole width of the profile. Unless the extrudate is contained, a degree of shrinkage could occur towards the extreme lateral edges which might require having to manufacture an extrudate that is over wide and requires trimming to width in order to be of sufficient dimensional accuracy.

The containment of the edges may be performed by employing narrow free rotating rolls. However when the gap between the chain mesh belts is small this may be geometrically difficult. It is preferred to employ a roller chain situated between the belts at the extreme edges of the profile and held in position by sprockets and the chain mesh belts themselves. The roller chain may optionally be covered with wire mesh on the side which is in contact with the extrudate. The roller chain may be separately driven. Alternatively, it may be in light contact with the mesh belts thus travelling with the belts and the extrudate at the same speed. The length of this roller chain may be the same as the parallel travel of the mesh belts or may be a lesser distance sufficient that the extrudate edges are set to a degree which is sufficient to maintain their desired dimensional tolerance. A further advantage of such an arrangement is that the roller chain may also be employed as a spacer between the complementary mesh belts and thus support the upper mesh belt at least partially against the gravitational force which could otherwise tend to deform the extrudate or tend to militate against accurate sizing. For this purpose it is particularly effective to employ a combination of such a contacting roller chain and the previously mentioned magnets.

The invention not only provides a process for forming sized or calibrated extruded products, but also such products per se when produced by the processes of the invention. The invention also provides such products which have a foamed core. They may optionally be laminated on one or both sides thereof with one or more unfoamed layers.

Where the product made under this invention is machined or otherwise to produce an edge or face which exposes the core material it may be sealed by the use of heat. This may be hot air, radiant heating or preferably by contact with a heated plate which may optionally be coated with PTFE in order to avoid sticking or build up of degraded polymer. For the food industry, in particular, it is advantageous that any exposed foam surface is sealed to avoid dirt or microbial build-up.

An alternative method of production to that of the profiled chain mesh belts employs relatively short profiled segments, successively mounted on caterpillar tracks in an articulated manner in such a way that new segments are rotationally successively presented to the extrudate. Such belts should be mounted in a complementary manner to each other. In a preferred form the segments are formed from perforated steel sheet. The perforations assist in obtaining initial adherence in a similar manner to that of the mesh in the chain mesh belts. Again in a similar manner to the mesh belts, the perforations assist in cooling of the extrudate. Furthermore, if the molten extrudate is expanding with internal pressure from either a foaming agent or other internal gas pressure, the extrudate may be forced to adhere to and conform to those belt segments thus assuming the shape and texture of those belt segments. Again in a similar manner to that of mesh belts, if adherence is insufficient for the extrudate to exhibit good sizing it can be assisted by heating the belt segments before coming into contact with the melt. Likewise sandblasting or otherwise roughening the surface of the belt segments may be employed to assist in obtaining sufficient initial adherence. By driving those caterpillar tracks and hence the belt segments at a speed appropriate to the exit speed of the extrudate from the extrusion die, the segmented belts can also act as the haul-off for the product. The extrudate may be cooled either partially or completely whilst still being retained by the belt segments, until those belt segments are peeled away from the extrudate via the action of the caterpillar tracks and hence those segments passing around the exit sprockets. Again in a similar manner to that of the above profiled chain mesh belts, an effect of the extrudate being initially sufficiently adhered to those belts performs a similar function to that of the vacuum in vacuum calibration of an extruded profile-without the complexity and expense which might otherwise be required where vacuum is used. This is generally assisted by some internal pressure from foaming or by other means of obviating the tendency for the formation of a partial internal vacuum which could occur in the extrudate through shrinkage of the plastics material due to cooling.

For any of the methods of sizing under this invention, after exit from the extrusion die, cooling other than endothermic occurs from the outside of the extrudate. Thus the skin(s) cool first giving rise to a gradient of varying degrees of unmelted and molten foamable core material, progressively toward the interior of the extrudate at a given distance from the die. At some finite distance from the die this progresses to the point where all of the extrudate has hardened or set. Prior to the point where the extrudate has set up to the extent that the dimensions of that extrudate can no longer be influenced by the means of calibration, it is desirable for the surfaces to be held against the means of calibration for a sufficient time to acquire and maintain the required dimensional accuracy. Under this invention this dimensional accuracy may be further enhanced to the extent that the internal forces of shrinkage due to cooling are also opposed by the internal force of expansion due to foaming or other internal gas pressure. For any given product the length of the dynamic calibration means becomes fixed after its manufacture. For this given product and given length of the means of sizing, a balance may be found between the variables of rate of extrusion, rate of cooling, the degree of adherence of the extrudate surfaces to the calibrator surfaces, and the internal pressure from foaming or other means of internal gas pressure, whereby the dimensional accuracy of the extrudate becomes maximized. For example, if the dimensional accuracy is sufficient for a given extrudate, this may be improved by lowering the rate of extrusion and hence slowing down the dynamic means of calibration, and/or decreasing the rate of cooling from the air blowers or other cooling means, and/or increasing the degree of adherence by any of the previously mentioned means, and/or increasing the amount of blowing agent or gas addition to the core material so that the foaming pressure is increased to a level consistent with the stated aim.

The profiled steel segments may be mounted by welding or any other suitable means onto means such as tabs mounted on the roller chain. These tabs may be referred to as "K2 Outer Links" or "K2 Attachments" in roller chain manufacturer's brochures. An advantage in using such an arrangement is that the roller chain itself may have sprockets and skid plates mounted at suitable intervals to support the segments on the bottom half. The upper segmented belt may have means such as tee bar attachments on each segment which present flat surfaces or rollers in the extrusion direction. This enables the ready use of supports for that belt against the gravitational force which might otherwise distort the extrudate. Magnets could also be used in a similar manner to that of the profiled chain mesh belts.

A further advantage of the segmented belts is the ability to more readily form return edges on the extreme sides of each segment on either the top, bottom or both segmented belts, such that the extrudate is laterally contained against any forces of expansion. This enables the production of a finished edge on the extrudate which may be shaped to eg rounded or square etc., whichever is appropriate for the product. Without containing the extrudate the product may present edges which require trimming. A further advantage is that the return edges on eg the top belt, may be in contact with the corresponding surface of eg the bottom belt and thus be used as an additional part of the means by which one segmented belt is uniformly spaced away from its counterpart. In this manner those return edges may also form part of the system that resists the gravitational force which might otherwise tend to deform the extrudate.

Unlike the approach used for the profiled chain mesh belts the die should be shaped so that it protrudes between the belts to an extent that the first presented segments which are met by the extrudate have completed their arcs and have closed the gap between the segments to a constant value. Otherwise a pinching action could occur. When that gap has closed to it's minimum level it must of course be no greater than that which would cause an unacceptable level of entry of molten thermoplastic extrudate or detrimentally affect the appearance of the extrudate.

In one aspect of this invention in each of the cases of the chain mesh belts or the segmented belts, one belt only may be profiled and the other may be flat or have a non-matching profile to that of its counterpart. Additionally, in another aspect of this invention there may be a combination of a chain mesh belt and a segmented belt.

Under this invention profiled extrudates can be made by a device profiled or corrugated in the lateral direction with respect to the forward movement of the extrudate in a direction at 90 degrees to that described previously so that the product includes lateral ribs. This may be done by employing belts or bands which are relatively rigid in the lateral direction with respect to the extrudate but which are sufficiently flexible in the longitudinal direction to pass around appropriately sized and shaped rolls. By way of illustration, a sheet of corrugated iron is relatively rigid in the length or longitudinal direction, i.e., along the direction of the corrugations, but may be readily bent around an appropriately sized roll in the other direction. A further similar illustration of this relative stiffness in one direction and relative rigidity in the other direction is that of some forms of roller doors. Under this invention, complementary shaped belts or bands may be employed on either side of the extrudate, or one belt may be shaped in one manner and another belt or belts may be shaped in a different manner eg one belt or band may be of a flat form. By suitable programming of the speed of the belts or bands with respect to the speed of exit of the melt from the extruder and particularly with a forming extrudate exhibiting internal gas pressure, a thickness of product may be formed that will totally occupy the gap between eg the male and female complementary sections of the belts or bands, thus forming or sizing the extruded product. Once again the extrudate is at least partially cooled cured or otherwise solidified whilst still in contact with the belts or bands which are also used to haul it away from the extruder in a controlled manner. Again it is a feature of the invention that the extrudate surfaces initially adhere to the inside surface of each of the belts or bands to a sufficient extent to retain its shape against the shrinkage forces during cooling. In this manner the product can be calibrated or sized to acceptable tolerances. It is to be understood that the initial adherence between the forming surface and the flowable extrudate can be promoted by any suitable means. For example the forming surface may be constructed of a material to which the chosen extrudate will inherently adhere when it is in the flowable state prior to solidifying. Alternatively it may include adherence means which promote such adherence. The adherence means could include any one or more of, means for heating the forming surface, profiling or shaping of the forming surface which can act as a physical key to bind the extrudate to the surface coating which promotes adherence, or means to physically engage, to suck or press the extrudate onto the forming surface. Where the forming-surface includes complementary recirculating belts formed of wire mesh, selection of the diameter of the wire used to form the mesh can additionally be used to control the degree of adherence subject to the nature of the flowable extrudate itself. In the case of segments made from perforated plate, the diameter or the shape of the perforations is an additional means of attaining the required degree of adherence.

Whatever the nature of the mechanism which is used to achieve adherence it is also important to provide that the adherence can be readily broken after the extrudate shape has been set to an extent that the extrudate meets and maintains the required dimensional tolerances. This is preferably at that point where the belts undergo a change of direction through passing around the end (exit) roll. Again, this may be inherent in the properties of the set extrudate and the forming surface. For example, applicants have found that initial adherence between a range of molten thermoplastics and wire mesh complementary belts is adequate for the purposes of the invention, particularly if the mesh has a surface texture or is heated to promote adhesion. However when the plastic cools and solidifies the adherence automatically reduces thereby allowing the finished product to be freed directly from the belts without any special steps taken to separate the two other than the inherent peeling effect as the belts or bands change direction through the action of passing around the end (exit) roll. It is desirable that intimate contact between the means of calibration and the extrudate be maintained for a time which is sufficient to produce a product with the required dimensional tolerances.

For some products and some plastics materials, e.g. those with a particular low melt viscosity, it may be advantageous to have the complementary belts, bands or segments disposed in a vertically downward direction or one which is somewhere disposed between horizontal and vertical. In this manner it is possible to process materials or shapes which may exhibit insufficient hot strength upon exit from the extruder to be able to be readily processed into profiled shapes in the horizontal plane. For such a calibration rig the closer the angle approaches that of vertically downward, the more that gravitational force is acting in a direction which assists the extrudate to escape cleanly from the extrusion die and to meet the complementary belts, bands or segments without detrimental effects occurring through gravity. This is particularly useful for example for PET or PBT and their copolymers and more particularly for PET in its lower melt viscosity forms such as those grades which are used for fibre or carbonated beverage bottle manufacture. The latter materials are considerably cheaper than the higher intrinsic viscosity (IV) grades of PET and have a ready availability as recycled material. These grades can however be most difficult to process by extrusion methods other than those employed for film or sheet, because of the effect of gravitational forces on a material of such low melt viscosity and low melt strength. Such film or sheet is frequently extruded vertically downwards into the nip of a pair of horizontally disposed calendar rolls because of the low melt viscosity and low melt strength of PET.

The vertical or inclined method of production could be employed for any of the methods of processing under this invention, but it must be recognized that the height requirements for such a production facility possibly requires a multi-story building with extrusion machinery considerably higher than the cut-off equipment at the downstream end of the production line. In some countries where the cost of ground level production facilities are very expensive and multi-level production is considered to be quite normal, such a vertical or near vertical production facility could be considered a positive advantage.

Whichever of the above methods of this invention are employed it is generally advantageous to coat the extrudate by means of co-extrusion or multi-layer extrusion by the methods known by those skilled in the art, to form a composite material. It is particularly advantageous to employ outer layers which are applied by co-extrusion, in which those layers provide a property or properties which are enhanced or complementary in some manner compared with those of the substrate material in order to create a marriage between the materials which is structurally or otherwise advantageous. An example of this is to provide improved rigidity via the use of a relatively rigid skin material to an otherwise flexible extruded product. It is an embodiment of this invention to provide methods of sizing or calibrating such co-extruded products and examples of the structural use of the resultant products.

It is also an embodiment of this invention to provide a method and apparatus by which a foamed or expanded thermoplastics core or substrate is extruded and is coated by means of co-extrusion, with a reinforced thermoplastics material. Under this invention when reference to "reinforced" is made, this is meant to convey that the Young's Modulus or stiffness of that material is substantially increased compared with that of the same polymeric material without such reinforcement, i.e. the thermoplastics material is not simply filled or extended in a manner that does not lead to a substantial increase in Young's Modulus compared with its non-reinforced counterpart. Filling or extending a thermoplastics material may be done for a variety of reasons known to those skilled in the art and is most often for economic reasons. For products made under this invention we define the minimum level of such improvement in Young's Modulus for a material to be considered "reinforced" is that the Young's Modulus should be at least doubled compared with that same polymeric material containing no reinforcement. The reinforcement may preferably be of a fibrous nature, e.g. glass fibre, carbon fibre, aramid fibre, naturally occurring fibres or any other fibrous material suitable for the processes of this invention. Additionally there may be particulate materials employed of a mineral nature, e.g. talc, mica, metal carbonates, clays, silica, wollastonite or glass spheres, provided their use meets the above criteria for reinforcement. This is more likely to be met through the use of a mixture of such particulate reinforcements together with a fibrous reinforcement. The preferred reinforcement is coupled glass fibre. For composite materials requiring extremely high Young's Modulus, carbon fibre or other very high strength fibres or mixtures including those with glass fibre are preferred. Composite materials made under this invention employ a reinforced thermoplastics skin material which confers to the composite material a Young's Modulus of at least fourfold and preferably at least sixfold and more preferably at least eightfold, that of the foamed core itself without any added coating. By suitable selection of the reinforced thermoplastics material the Young's Modulus of the composite product can somewhat approach the value of the modulus of the reinforced plastics skin material. For example, we have found that high-density polyethylene foam with a specific gravity of 0.4, without any skin added by co-extrusion, has a calculated Young's Modulus of approximately 200 Mpa when calculated from measurements of load versus deflection on an extruded section measuring approximately 100 mm wide by 20 mm thick. When a coating of less than 1 mm of coupled glass reinforced polypropylene which has been suitably modified to exhibit a degree of compatibility with high density polyethylene and containing approximately 19% glass fibre by weight, is co-extruded as a skin on to that same section, a Young's Modulus for the composite is calculated in the same manner which exceeds 1200 Mpa. That same reinforced polypropylene which has been suitably modified to exhibit a degree of compatibility with high density polyethylene and containing approximately 29% glass fibre by weight exhibits a Young's Modulus of approximately 2000 Mpa. Similar results are obtained when approximately half of the glass fibre content is substituted with talc of the platy type or coupled mica. These are considerably greater values for the Young's Modulus than if the product were made from solid high-density polyethylene at more than double the mass, thus showing a considerable increase in efficiency. If that coating thickness is farther increased, the modulus of the composite is further increased.

A further efficiency benefit can be obtained for some particular extruded profiles or sections by applying a different thickness of coating to some areas of the extruded section in order to obtain eg greater rigidity, for less usage of the more expensive coating material. For example a plastics structure will frequently fail by buckling under a compressive load. Generally, that failure will occur at the skin or surface layer on the concave face, i.e. at the surface under compression. Thus if the more expensive coating material is applied at a greater thickness on the concave side and less on the convex side a structure with greater load bearing capability could be made for less cost. Further structural benefits of applying a thicker skin in some areas compared with others can be readily determined through the application of engineering design and calculations. Through the use of such calculations, greater thickness need only be applied to those surfaces or parts of the surfaces, where the greatest structural benefit can be attained for the greatest efficiency, i.e. lowest cost.

A further advantage of a composite structure of the type in the foregoing paragraphs is that the expansion contraction properties of the composite structure may approach those of the reinforced plastics skin material. This is considerably lower in value than its unreinforced counterpart, thus the product illustrates improved dimensional stability. Furthermore a skin material can be chosen which itself has lower expansion contraction characteristics than that of the substrate material and in this manner the product can exhibit improved dimensional stability. By way of example, high-density polyethylene foam is coated with coupled glass reinforced polypropylene which has been modified to exhibit improved compatibility with high-density polyethylene. Such glass reinforced polypropylene exhibits very low expansion contraction values compared with high-density polyethylene and can so dominate the extruded thermoplastics composite structure that the expansion contraction characteristics of the composite product are more similar to those of the skin material than the core material. In a similar manner the creep properties of the same composite structure are dominated by the creep properties of the more rigid surface material and thus for the example immediately above are similar to that of the glass reinforced polypropylene or its copolymers. Thus a structure can be created under this invention which may be composed in the majority by mass, e.g. of foamed high-density polyethylene and a minority by mass, e.g. of glass reinforced polypropylene which has been modified to exhibit improved compatible with high-density polyethylene, yet exhibit expansion contraction and creep characteristics similar to that of the minority skin material. In products made under this invention, glass reinforced plastics particularly a polyolefin such as polypropylene may be present to the extent of as little as 10% or even less of the total mass of the extruded composite product. If the high-density polyethylene consists of scrap reclaimed from milk bottles (thus exhibiting good toughness and being uniform in content), the resultant products show excellent economics as well as assisting in protecting the environment through reduced pollution. A further advantage exists in employing polypropylene which has been modified to exhibit improved compatibility with high-density polyethylene in that the product may be recycled without compatibility concerns thus again reducing potential pollution.

Likewise any reinforced thermoplastics material may be directly co-extruded to preferably a foamed thermoplastics core material which exhibits a sufficient degree of compatibility between the thermoplastics materials that the structure when repeatedly stressed to a level design and calculations. Through the use of such calculations, greater thickness need only be applied to those surfaces or parts of the surfaces, where the greatest structural benefit can be attained for the greatest efficiency, i.e. lowest cost.

A further advantage of a composite structure of the type in the foregoing paragraphs is that the expansion contraction properties of the composite structure may approach those of the reinforced plastics skin material. This is considerably lower in value than its unreinforced counterpart, thus the product illustrates improved dimensional stability. Furthermore a skin material can be chosen which itself has lower expansion contraction characteristics than that of the substrate material and in this manner the product can exhibit improved dimensional stability. By way of example high-density polyethylene foam is coated with coupled glass reinforced polypropylene which has been modified to exhibit improved compatibility with high-density polyethylene. Such glass reinforced polypropylene exhibits very low expansion contraction values compared with high-density polyethylene and can so dominate the extruded thermoplastics composite structure that the expansion contraction characteristics of the composite product are more similar to those of the skin material than the core material. In a similar manner the creep properties of the same composite structure are dominated by the creep properties of the more rigid surface material and thus for the example immediately above are similar to that of the glass reinforced polypropylene or its copolymers. Thus a structure can be created under this invention which may be composed in the majority by mass, e.g. of foamed high-density polyethylene and a minority by mass eg of glass reinforced polypropylene which has been modified to exhibit improved compatible with high-density polyethylene, yet exhibit expansion contraction and creep characteristics similar to that of the minority skin material. In products made under this invention, glass reinforced plastics particularly a polyolefin such as polypropylene may be present to the extent of as little as 10% or even less of the total mass of the extruded composite product. If the high-density polyethylene consists of scrap reclaimed from milk bottles (thus exhibiting good toughness and being uniform in content), the resultant products show excellent economics as well as assisting in protecting the environment through reduced pollution. A further advantage exists in employing polypropylene which has been modified to exhibit improved compatibility with high-density polyethylene in that the product may be recycled without compatibility concerns thus again reducing potential pollution.

Likewise any reinforced thermoplastics material may be directly co-extruded to preferably a foamed thermoplastics core material which exhibits a sufficient degree of compatibility between the thermoplastics materials that the structure when repeatedly stressed to a level which is appropriate to its end use, does not delaminate. Such compatibility particularly occurs in members of the same generic family. However means of compatibilizing non generically similar thermoplastics materials are known to those skilled in the art. Also known is the use of a tie layer where a third thermoplastics material is co-extruded between incompatible polymers and that tie layer material is itself compatible with each of the core and the skin polymers. Such tie layers are particularly well known in multi-layer co-extruded film production. Some examples of such known tie layer polymers are the ionomer resins, copolymers of acrylic acid, ethylene vinyl acetate, etc.

Preferred composites of the present invention include, for example: glass fibre reinforced polypropylene or its copolymers as skin material co-extruded over foamed polypropylene or its copolymers; glass fibre reinforced high density polyethylene co-extruded over foamed high density polyethylene; and glass fibre reinforced polypropylene or its copolymers as skin material with a tie layer of eg ionomer resin, copolymers of acrylic acid, ethylene vinyl acetate, etc. and a co-extruded core of foamed high density polyethylene. The most preferred composite made under this invention is glass fibre reinforced polypropylene or its copolymers which has been modified to exhibit improved compatible with high-density polyethylene, co-extruded over a foamed high density polyethylene core. Such glass fibre may be substituted up to 66% with a particulate mineral reinforcement.

A sufficient degree of compatibility between coupled glass fibre reinforced polypropylene or its copolymers as skin material and high density polyethylene foam can occur simply by adding eg approximately 50 parts per hundred of high density polyethylene to a 20 to 40% coupled glass fibre reinforced polypropylene copolymer. The highest preference is for a mixture of approximately 50 parts per hundred to 100 parts per hundred of a compound containing 20 to 40% of a compound of coupled glass fibre reinforced polypropylene copolymer with 50 parts per hundred to 100 parts per hundred of 20 to 40% coupled glass fibre reinforced high density polyethylene. In one aspect of this invention such composites may be heat or finer rod welded to either of polypropylene or high density polyethylene sheet or mouldings to provide strong welds to either polymer without any additional surface or other treatment.

It is hypothesised that the coupling agent(s) together with the different sizing agents (which may themselves be coupling agents) on the glass fibres enable sites where the different polymers can co-exist on the glass fibres and hence provide a sufficient degree of compatibility for these relatively incompatible polymers to not exhibit delamination at the frequency and level of stress appropriate to that experienced by eg a materials handling pallet loaded with 1000 kg mass.

Ultraviolet radiation absorbers and colorants need only be applied to the skin material thus exhibiting considerable savings compared with that of applying those relatively expensive materials to the whole of the product. Additionally where desired the core material may be cheaply colored grey or black to enhance its LTV stability where that core material is exposed.

Where desired, additives may be employed which impart specific properties to the product, eg biological or zoological attributes such as fungicidal and biocidal properties, particularly for the food, medical or veterinary industries. Likewise additives may be employed to impart anti-static properties to the products in order to reduce dust attraction which is a known problem for plastics products. The additives are well known to those skilled in the art. These may be applied to the skin materials only or to the whole product.

Additional surface properties may be imparted to the composite thermoplastics extrudate in order to reduce or enhance frictional properties 1e to provide more slip or less slip. For example if any of the above methods of this invention is employed to produce the top deck of a pallet or skid for use with Fork Lift Trucks (FLT). A frequent requirement for plastics pallets is that when loaded with a standard load, they do not slip from the tines of that FLT when travelling at full speed and applying full braking. There is a similar requirement with respect to the goods on the pallet not slipping off the pallet under the same test. Methods are already employed with plastics pallets (where it is a known problem) in which rubber strips are added to the underside of the top deck of the pallet and/or a texture is provided on the top surface of the top deck to provide grip on that surface. Such grip could be economically provided by the application of an additional coating or skin of a plastics material which exhibits appropriate frictional properties, extruded onto the surface or surfaces. Such a higher friction coating would normally, under this invention, be applied over the high Young's Modulus skin. Thus the top deck might be a composite of five or more layers and consist of three or more discrete extruded thermoplastics materials, each providing particular values to the properties of the structure. Expanding on a previous example and beginning from the substrate or core material, the high-density polyethylene foam serves the purposes of being a relatively inexpensive, tough, volume core. The modified glass reinforced polypropylene has the functions of making the composite product much more rigid and reducing the creep and the expansion contraction characteristics. The outermost anti-slip layer (which may be a complete layer over one or both surfaces of the top deck of the pallet, or may be present only as extruded strips or stripes) of possibly a thermoplastics elastomer, an ionomer resin, ethylene vinyl acetate or any other known thermoplastics material which exhibits increased friction, friction as anti slip and when required, as a tough protective outermost skin. If the and slip polymer could detrimentally effect the attainment of strong welding, where applicable, of the underside of the top deck to the stringers, such polymer could usefully be applied only in strips or stripes on that underside of the top deck such that it is not present in those regions where welding might subsequently occur. This could be done by suitable programming to control an appropriate intermittent application of such anti slip coating to the underside of the top deck.

Under this invention, the extrusion die lips may be of an essentially flat shape or may be of a similar profiled shape to that of the shaped belts or bands. In either case it is preferable to employ a mandrel disposed between those die bps and of a shape which corresponds to that of the die lips. If the core material of the extrudate is of a foaming or expanding constitution, the use of such a mandrel disposed between the die lips enables pressure to be maintained on the melt up to those die lips so that expansion occurs largely only when the pressure is reduced upon exiting those die lips. Furthermore the internal space created by the mandrel is such that at least 30% and preferably the majority of the foaming or expansion may occur inwards into that internal space which consequently becomes filled with foam. The advantage of this is in containing the foaming in a controlled manner and can obviate the problem enumerated by Suzuki in U.S. Pat. No. 4,889,669, i.e. "corrugation phenomenon", because the majority of the foaming may occur inwards. In this manner such a "corrugation phenomenon" does not exhibit itself in any manner which is observable in the extrudate even when eg there is no additionally applied skin over the foam, a situation which frequently occurs on start-up prior to commencing the application of a reinforced plastics skin. In an example of an extrusion die which is essentially flat which was employed to make the samples under Example 1. There is approximately 2.5 times the area of mandrel compared with that of the die gap. Foaming is frequently eg of the order of 2.5 to 4 fold, thus the majority of the foaming may occur inward, obviating any problem of "corrugation phenomenon". It is particularly desirable that foaming in the lateral width direction is kept to the minimum level for a similarly profiled die to that of the product, simply because it is otherwise more difficult to predict the required shape of the die lips for the production of a given profile. By having the internal space created by the mandrel, foaming can occur into that space and thus a lesser amount of foaming occurs in the outward directions. For reasons of complexity and thus cost, such a die would in general only be of a similarly profiled shape to that of the profiled extrudate in order that the die lips may be disposed within the essentially longitudinal parallel section of complementary belts bands or segments. That foaming which does occur in the outward directions is then more readily able to be accommodated by the enclosed space within the profiled belts, bands or segments and through balancing the speed of the recirculating belts bands or segments, relative to the speed of the extrudate. It is of course, a matter of design to create the appropriate dimensions of the die and mandrel to balance between the expansion in the various directions within the geometric constraints.

Where it is desired to use internal gas pressure generated by means other than through foaming, this may be injected through gas passageways in the mandrel or by replacing the mandrel with a series of appropriately positioned tubes with the die.

Where extruded thermoplastics foam is employed, it may be produced through the incorporation of chemical or physical blowing agents. It is preferred under this invention to employ physical blowing agents because of firstly their enhanced ability to produce lower specific gravity foam for a relatively small quantity of such substance. Secondly, physical blowing agents are endothermic because they function by evaporating or a phase change of a liquid substance, or by expansion of a pressurized gas which may be absorbed in the melt at the pressures concerning the process. Each of these mechanisms absorb energy when expansion occurs. This expansion and thus absorption of energy, can be made to largely occur only on exiting the die, thus lowering the temperature of the extrudate. This is of assistance through immediately increasing the melt viscosity and melt strength of the extrudate, thus assisting in the sizing or calibration of products made under this invention. The amount of energy absorbed can be somewhat controlled by selection of the physical blowing agent composition and the quantity of such physical blowing agents employed. Some chemical blowing agents are also endothermic, eg sodium bicarbonate, however a relatively large percentage has to be employed compared with the physical blowing agents in order to achieve the appropriate specific gravity of products made under this invention.

Most thermoplastics pallets do not have sufficient rigidity for general use as Pooling pallets in a racked situation especially if that racking utilises only outwardly projecting support bars, known as "drive-in racking". ISO/DIS 8611-1 "Pallets for Materials Handling" provides test methods and requirements for all pallets regardless of material of construction. ISO/DIS 8611-1 Clause 8.2 "Racking Support Stiffness Test", requires that a pallet of eg 1200 mm wide×1000 mm deep be horizontally symmetrically supported on two 50 mm wide full-length support bars at 1050 mm centres and the rated load, typically 1000 kg is applied at a specified rate, through two further 50 mm wide, full-length load bars at 525 mm centres and that load is maintained for 24 hours (in the case of plastics pallets). The maximum allowable deflection under this test for a 1200×1000 mm pallet is 21 mm (regardless of the materials of construction). The general lack of rigidity of thermoplastics materials economically suitable for use in pallets, given the other constraints under this standard, such as the impact requirements, have given rise to the use of non-thermoplastics reinforcing members eg steel or pultruded rods, being added to the thermoplastics pallets structure in order to pass this ISO loading requirement or to otherwise meet the needs of the Pooling Pallets market. U.S. Pat. No. 3,814,778 is an example of the many specifications employing such reinforcing members. The use of such reinforcing members either render the pallet non-recyclable or special means must be employed to separate the materials of construction in order to enable recycling of the various components, but in any case the materials of construction of the pallet are thus tendered unable to be simply recycled. Pallet pooling is well established in most developed countries and repair or recycling is an issue which must be addressed in those countries. It is understood that there exists an additional requirement under European Economic Community (EEC) regulations, that a pallet cannot exceed 25 kg mass. This is a further severe constraint on plastics pallets hitherto known, for a pallet of the above dimensions with a required load rating of 1000 kg. In a further aspect the invention provides a pallet having a top deck which has a cross-sectional profile including a plurality of elongate channel shaped sections. The elongate channels suitably have a depth which is equal to or greater than one quarter, more preferably one third and up to three quarters of the depth of the top deck. Most suitably the channel shaped sections are provided on both the top and bottom of the top deck to give the top deck a corrugated appearance. The channels serve to increase stiffness of the top deck while making more efficient use of material compared with that which would otherwise be needed to make a product of the same load bearing capability.

Most suitably the top deck will be formed of material produced in accordance with the process of this invention. It may be formed of thermoplastics material. It may be in the form of a single integral sheet of material. It may have a foamed core. It may include an unfoamed skin formed on one or both sides of the top deck. It may be corrugated. The depth of the corrugations may be at least 10 mm.

A corrugated design may also exhibit superior "flatness" of the top deck because of the reduced stress inherent in such a design, compared with the same structure having a non-corrugated top. Additionally, it may also exhibit higher impact strength without failure by breakage because of its enhanced ability to absorb such stress compared with the same structure having a non-corrugated top deck.

The top deck may be mounted on stringers running generally perpendicular to the channels on the top deck. There may be three stringers. Two stringers may extend along either side of the top deck and there may be one centrally.

The upper sides of the stringers may be shaped to be complementary to the profile of all or part of the underneath of the top deck. The stringers may be formed of any suitable material such as wood or plastics although thermoplastics are preferred. The top deck may be welded to the stringers. Most suitably the welding extends over the entire length of contact between the top deck and the stringers.

In one embodiment of the invention, the bottom of the stringers may be connected by one or more sheets or planks. There may be two or more planks. They may run generally parallel to the channel shaped sections. The one or more sheets or planks may have a cross-sectional profile including one or more elongate channel shaped sections and may additionally contain cross reinforcement ribs. The one or more elongate channel shaped sections of the sheets or planks suitably have a depth which is equal to or greater than one quarter more preferably up to three quarters the depth of the sheets or planks. The channels may be on only one side or both sides of the sheets or planks.

The bottom of the stringers may be complementary to the upper surface of the sheets or planks. The sheets or planks may be formed of thermoplastics materials. The sheets or planks may have been formed in accordance with the process of the invention. They may be welded to the bottom of the stringers.

Alternatively the stringers and base may be moulded or formed in one piece from thermoplastics material and may incorporate features such as fork lift truck tine windows or entries, projections or recesses for interlocking, label holding means and logos etc. Such a base and stringers may also incorporate upper stringer surfaces which are of a complementary shape to that of the profile of the underside of the top deck to facilitate welding or other means of joining. An advantage of such a form of one piece construction of base and stringers is that there are thus only two pieces to join together 1e a base and a top, in order to make a pallet.

In a particularly preferred aspect the invention provides a thermoplastics pallet having a reinforced co-extruded top deck which when welded or otherwise suitably joined to the other components of the pallet forms a structure which will meet the requirements for a 1000 Kg rating under ISO/DIS 8611 and further may also meet the EEC requirement of being less than 25 Kg mass. Such a pallet may be constructed without employing additional and separate non-thermoplastics reinforcing members, such as steel, wood or pultruded shapes.

DETAILED DESCRIPTION OF THE PREFERRED EMBODIMENTS

EXAMPLE 1

Approximately 100 mm wide×20mm thick planks were extruded using a tandem single screw extrusion line consisting of a primary 3.5 inch extruder melt pressure feeding a secondary 3 inch extruder incorporating a gear pump immediately before the extrusion die. The sizing system consisted of a pair of flat complementary chain mesh belts of the type before mentioned, which at the early stage of the development program were only 300 mm long in the longitudinally parallel direction. This was operated at a low linear speed of less than 400 mm/minute, to enable product to be experimentally produced and assessed. (At a later stage of development and by then employing profiled belts, the parallel length of belt was increased to 2500 mm and the linear speed was more than doubled). The two edges of the extrudate were contained by two air chambered static devices with porous sintered metal surfaces against the extrudate and pressurized air was employed to provide an air slide to generally prevent adherence of the sides to an extent that the haul-off could not pull the product away without rupture necessitating a shut-down.

The planks consisted of a foamed core containing varying quantities of high-density polyethylene in both virgin form and from reclaimed milk bottles mixed with varying quantities of low density polyethylene and to this was added varying quantities of talc filled low density polyethylene the latter being for purposes of nucleation. A common formulation consisted of approximately 75% of a HDPE of MFI 4.0 and SG of 0.96, plus 23% of LDPE of MFI 0.3 and SG of 0.917, plus 2% of an LDPE compound containing 40% talc. Each formulation was extruded and foamed with a physical blowing agent and exhibited a specific gravity varying from about 0.2 to 0.5 g/cc. Generally the section thickness overall was approximately 20 mm and the thickness of the co-extruded reinforced plastics skin was varied from approximately 0.6 mm to approximately 1.5 mm. Various reinforcements were utilized in the skin formulation and the polymeric component of the skin system comprised either PP or HDPE or a mixture of the two. During start-up and for purposes of comparison, foamed material was also extruded without any additional co-extruded skin.

Planks made in the above manner were tested for load bearing with the load being automatically recorded in Newtons and the deflection automatically recorded in mm after the deflection was constant for 5 seconds. These values were entered into an Excel spreadsheet and the Young's Modulus was calculated by a formula in that Excel spreadsheet. Table 1 presents some of those results utilizing similar formulations of core material to enable easier comparison.

TABLE 1

| Formulation of Skin Material | Est. Thick. of Skin Material | Temp ° C. | Defln. mm. | Calc. E. Mod. Mpa | Stiff. Ratio |
|---|---|---|---|---|---|
| No added skin | 0 | 22 | 95 | 210 | 1 |
| 65% of (45% talc filled PP) + 35% HDPE | 0.8 | 21 | 49 | 390 | 1.9 |
| 65% of (45% mica filled PP) + 35% HDPE | 1.0 | 22 | 20.5 | 920 | 4.4 |
| 33% of (40% talc filled PP) + 33% HDPE + 33% of (30% glass fibre reinforced PP) | 0.8 | 22 | 17.4 | 1090 | 5.2 |
| 65% of (30% glass fibre reinforced PP) + 35% HDPE | 0.8 | 22 | 14.6 | 1300 | 6.2 |
| 65% of (30% glass fibre reinforced PP) + 35% HDPE | 1.0 | 22 | 12 | 1560 | 7.4 |

TABLE 1-continued

| Formulation of Skin Material | Est. Thick. of Skin Material | Temp ° C. | Defln. mm. | Calc. E. Mod. Mpa | Stiff. Ratio |
|---|---|---|---|---|---|
| 65% of (30% glass fibre reinforced PP) + 35% HDPE | 1.25 | 22 | 10.5 | 1800 | 8.6 |

Notes
1. All measurements were performed on the same apparatus employing a load of 312 Newtons on unrestrained specimens. AD results are averaged.
2. Each of the skin formulations containing talc, mica or glass fibre were each separately pre-compounded in PP and were in granulate form which dry mixed with HDPE granules and/or another named reinforced thermoplastics compound which was fed to the hopper of the coating extruder.
3. Results with mica show too much variability and are thus considered to be unreliable.
4. Stiffness ratio is the ratio of the calculated Modulus of the specimen compared with that for the specimen with no added skin (Row 1.).
5. Skin thickness is estimated.

EXAMPLE 2

Single planks of a profile, consisting of one corrugation having two "wings" were extruded of a shape generally that of FIG. 3(b). The extrusion machinery was that of Example 1, however the sizing device consisted of complementary profiled chain mesh belts of 2500 mm length and the air slides were replaced with roller chains which progress together with those belts. Similar foamed core thermoplastics materials we're employed as in Example 1. Generally the profile section thickness was approximately 15 mm and the thickness of the reinforced plastics skin was varied from approximately 0.75 mm to approximately 1.25 mm. The overall depth of the profile was nominally 33 mm and the width was nominally 110 mm. The specific gravity of the composite extrudate varied from about 0.4 to 0.65 with a common value being about 0.45.

Deflection versus load testing was carried out in the same manner as for Example 1 on the same apparatus. The Young's Modulus is not here calculated because the actual deflection for a given load is more useful for this more rigid shape. The results are given in Table 2.

TABLE 2

| Formulation of Skin Material | Est. Thick. of Skin Material | Temp ° C. | Defln. mm. | Calc. E. Mod. Mpa | Stiff. Ratio |
|---|---|---|---|---|---|
| No added skin (NB flat specimen from Table 1) | 0 | 22 | 95 | 720 | 1 |
| 33% of (40% talc filled PP) + 33% HDPE + 33% of (30% glass fibre reinforced HDPE) | 0.9 | 18 | 7.5 | 684 | 12.7 |
| 33% of (40 mica filled PP) + 33% HDPE + 33% of (30% glass fibre reinforced | 1.0 | 18 | 8 | 672 | 11.9 |
| 100% of (40% glass fibre reinforced HDPE) | 1.25 | 19 | 4 | 860 | 23.8 |
| 65% of (30% glass fibre reinforced PP) + 35% HDPE | 0.75 | 18 | 8 | 742 | 11.9 |
| 65% of (30% glass fibre reinforced PP) + 35% HDPE | 0.75 | 40 | 9.5 | 742 | 10 |
| 65% of (30% glass fibre reinforced PP + 35% HDPE | 1.0 | 18 | 7.5 | 821 | 12.7 |
| 65% of (30% glass fibre reinforced PP) + 35% HDPE | 1.25 | 18 | 6.5 | 896 | 14.6 |

TABLE 2-continued

| Formulation of Skin Material | Est. Thick. of Skin Material | Temp °C. | Defln. mm. | Calc. E. Mod. Mpa | Stiff. Ratio |
|---|---|---|---|---|---|
| 50% of (30% glass fibre reinforced PP) + 50% of (40% glass fibre reinforced HDPE | 0.75 | 18 | 5 | 890 | 19 |
| 50% of (30% glass fibre reinforced PP) + 50% of (40% glass fibre reinforced HDPE) | 1.0 | 18 | 4.5 | 830 | 21 |
| 50% of (30% glass fibre reinforced PP) + 50% of (40% glass fibre reinforced HDPE) | 1.25 | 18 | 4 | 866 | 23.8 |
| 50% of (30% glass fibre reinforced PP) + 50% of (40% glass fibre reinforced HDPE) | 1.25 | 40 | 5 | 866 | 19 |
| 50% of (30% glass fibre reinforced PP) + 50% of (40% glass fibre reinforced HDPE) | 1.25 | 60 | 13.3 | 866 | 7.1 |
| 70% of (40% glass fibre reinforced PP) + 30% HDPE | 1.0 | 20 | 5 | 632 | 19 |

Notes
1. All measurements were performed on the same apparatus under the same conditions as for Table 1. and employing the same load of 312 N on unrestrained specimens. All results are averaged.
2. Each of the skin formulations containing talc, mica or glass fibre were each separately pre-compounded and were in granulate form which was dry mixed with HDPE granules and/or another named reinforced thermoplastics compound which was fed to the hopper of the coating extruder.
3. Skin thickness is estimated.
4. Stiffness ratio is the ratio of the deflection of the profiled composite compared with that for the flat specimen of Example 1 with no added skin (from the first row of Table 1.)

EXAMPLE 3

Plastic pallets of the type illustrated in FIG. 4 were fabricated from planks of the type which had been evaluated in Table 2, by heat welding those co-extruded single corrugated planks together to form pallet top decks. Ten such single planks were hot plate welded side by side after having their skinned welding edges removed, to form a top deck of 1000 mm width by 1200 mm. length. The top decks were in turn filler rod welded to three appropriately profiled stringers which were fabricated from polypropylene or high-density polyethylene sheets of 6 or 8 mm sheet thickness. Occasional ribs were filler rod welded internally in each of the three separate stringers to make each stringer into a box type structure. These fabricated stringers also had an appropriately profiled shape on their lower edges to facilitate filler rod welding of three pairs of welded corrugated planks to form the base of the pallet. The clearance height between the underside of the top deck and the upper side of the base planks was about 95 mm.

Pallets made in the above manner were tested by the method detailed in the "Racking Support Stiffness Test" of ISO/DIS 8611, "Pallets for Materials Handling". The deflection was firstly measured after 15 seconds for an instantaneous reading and finally at 24 hours. The room temperature was measured at the beginning of the test and at several times during the 24 hours and the temperature was appropriately averaged. Table 3 presents some of those results.

TABLE 3

| Formulation of Skin Material | Est. Thick. of Skin Material | Temp °C. | Defln. mm. | Calc. E. Mod. Mpa | Stiff. Ratio |
|---|---|---|---|---|---|
| 65% of (30% glass fibre reinforced PP) + 35% HDPE | 1.0 | 18 | 12.5 | 24 | 1000 |
| 70% of (40% glass fibre reinforced PP) + 30% HDPE | 1.0 | 20 | 8.37 | 15.8 | 1000 |
| 50% of (30% glass fibre reinforced PP) + 50% of (40% glass fibre reinforced HDPE) | 1.25 | 23 | 7.9 | 14.4 | 1000 |

When the same test is carried out with similarly fabricated pallets using the same support bars at the same centres, but with 1000 Kg of plastics granules in 25 Kg bags stacked directly onto the pallet, ie a distributed load, the following are the results.

TABLE 4

| Formulation of Skin Material | Est. Thick. of Skin Material | Temp °C. | Defln. mm. | Calc. E. Mod. Mpa | Stiff. Ratio |
|---|---|---|---|---|---|
| 70% of (40% glass fibre reinforced PP) + 35% HDPE | 1.0 | 20 | 6.5 | 12 | |
| 50% of (30% glass fibre reinforced PP) + 50% of (40% glass fibre reinforced HDPE) | 1.25 | 23 | 5.0 | 9.3 | 9.9 |

In order to make a 1200×1000 mm pallet which will pass the 1000 Kg rating of ISO/DIS 8611, "Pallets for Materials Handling, Racking Support Stiffness Test", assuming welding of a co-extruded composite pallet top deck to an appropriate base including three stringers, the co-extruded composite pallet top deck preferably consists of: 7 to 12 corrugations on each side and a total beam depth of 33 to 40 mm (top surface to bottom surface over all)

General foam thickness of the core of 12 to 15 mm consisting of 70 to 98% HDPE, 0 to 28% LDPE and 0.8 to 2% of talc. To the total is added up to a further 1% of a physical blowing agent.

An average thickness of the reinforced plastics skin of 1.0 to 1.25 mm. The reinforced thermoplastics skin material consisting of a compound of 30 to 40% coupled glass fibre reinforced PP mixed in equal proportions with a compound of 30 to 40% coupled glass fibre reinforced HDPE; or a compound of 30 to 40% coupled glass fibre reinforced PP mixed with 30 to 35% HDPE.

BRIEF DESCRIPTION OF THE DRAWINGS

The invention is hereinafter described by reference to the drawings in which:

FIG. 1 is a schematic diagram of an extrusion die (extruder not shown) and two driven forming belts or bands;

FIG. 1a is a schematic diagram of the rollers employed to drive and tension the forming belts or bands in FIG. 1;

Figure 3A:
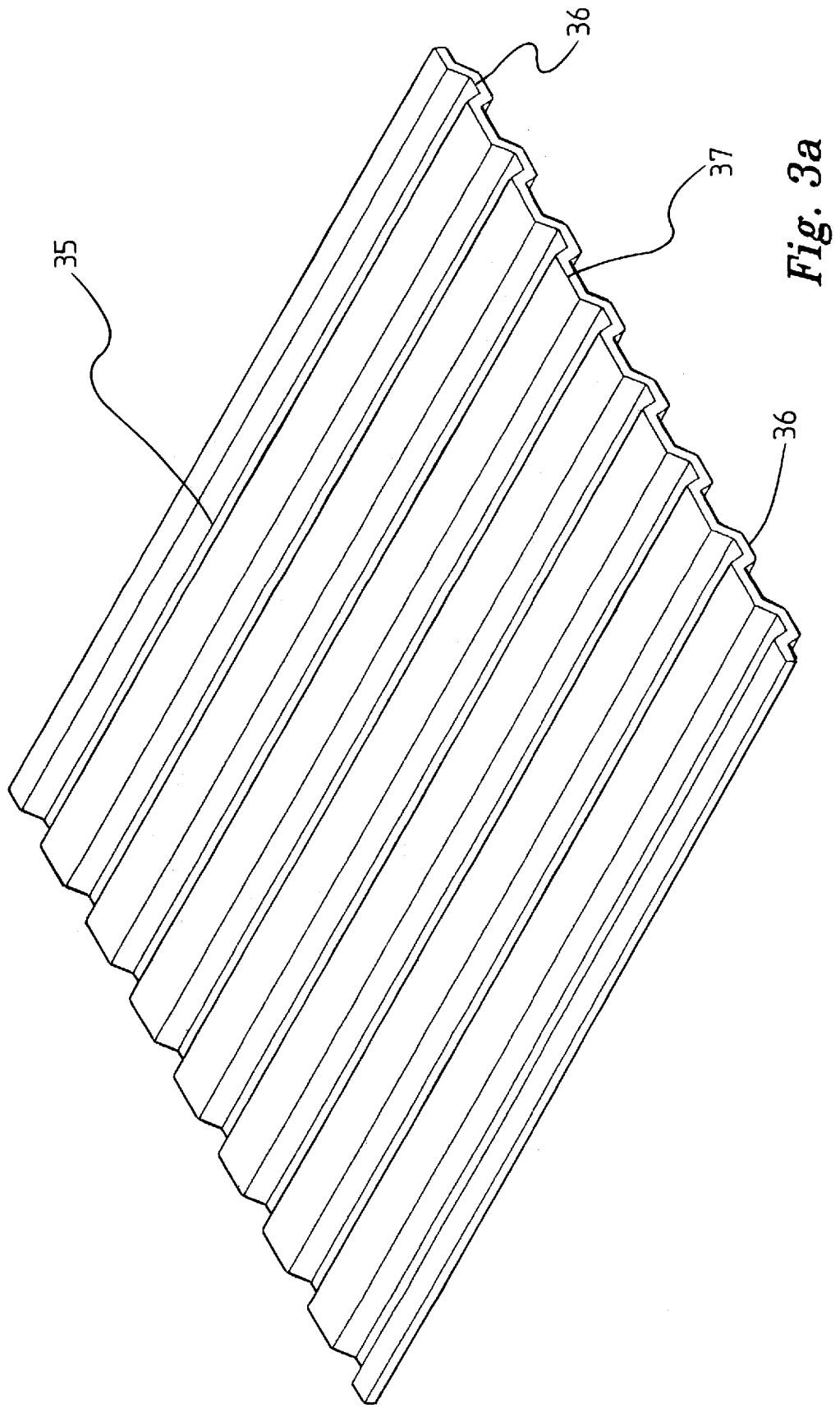
FIG. 3(a) is a schematic drawing of an extruded section which may be suitable for use as a top deck of a pallet.
Figure 4:
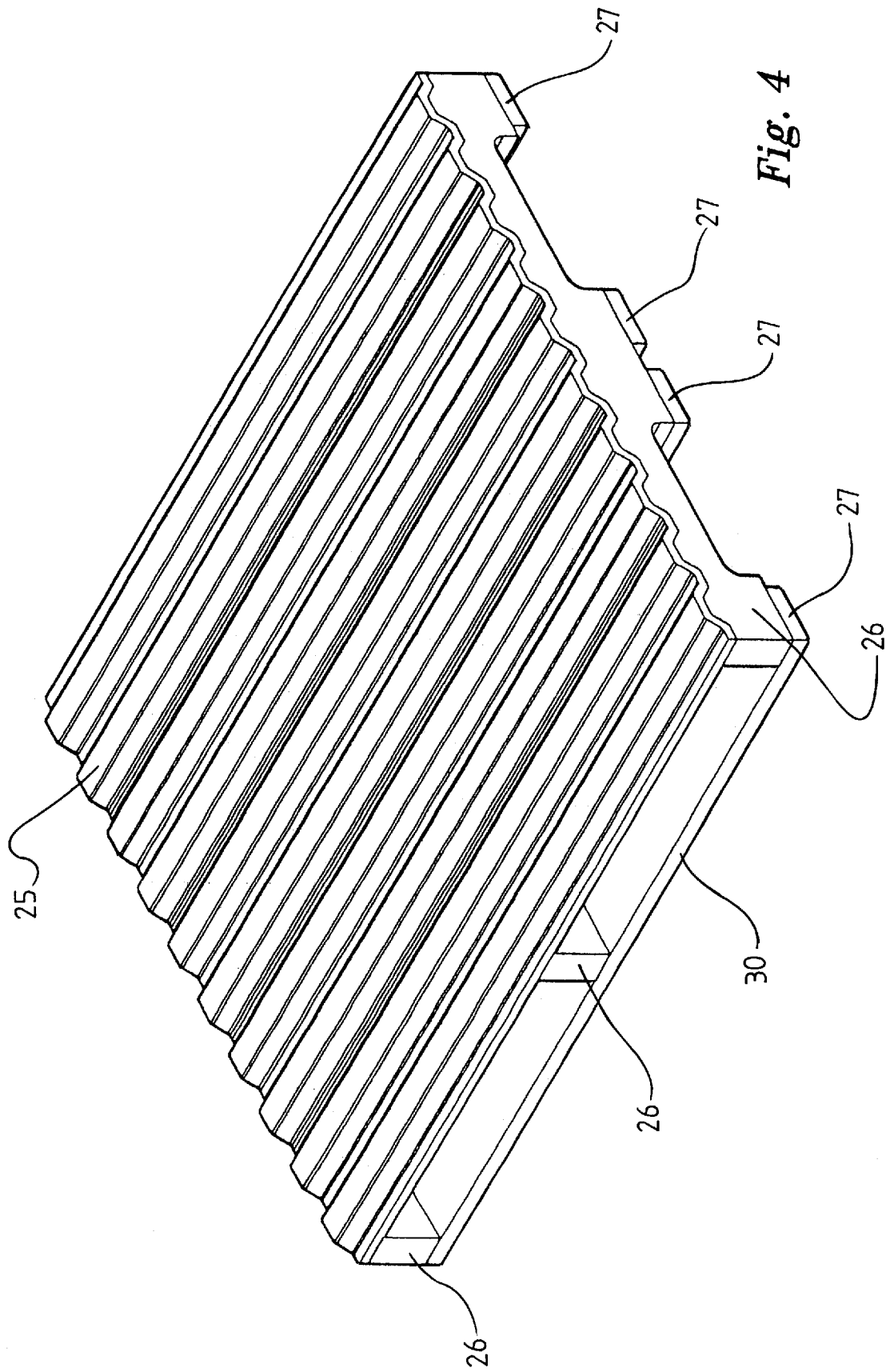
Figure 5:
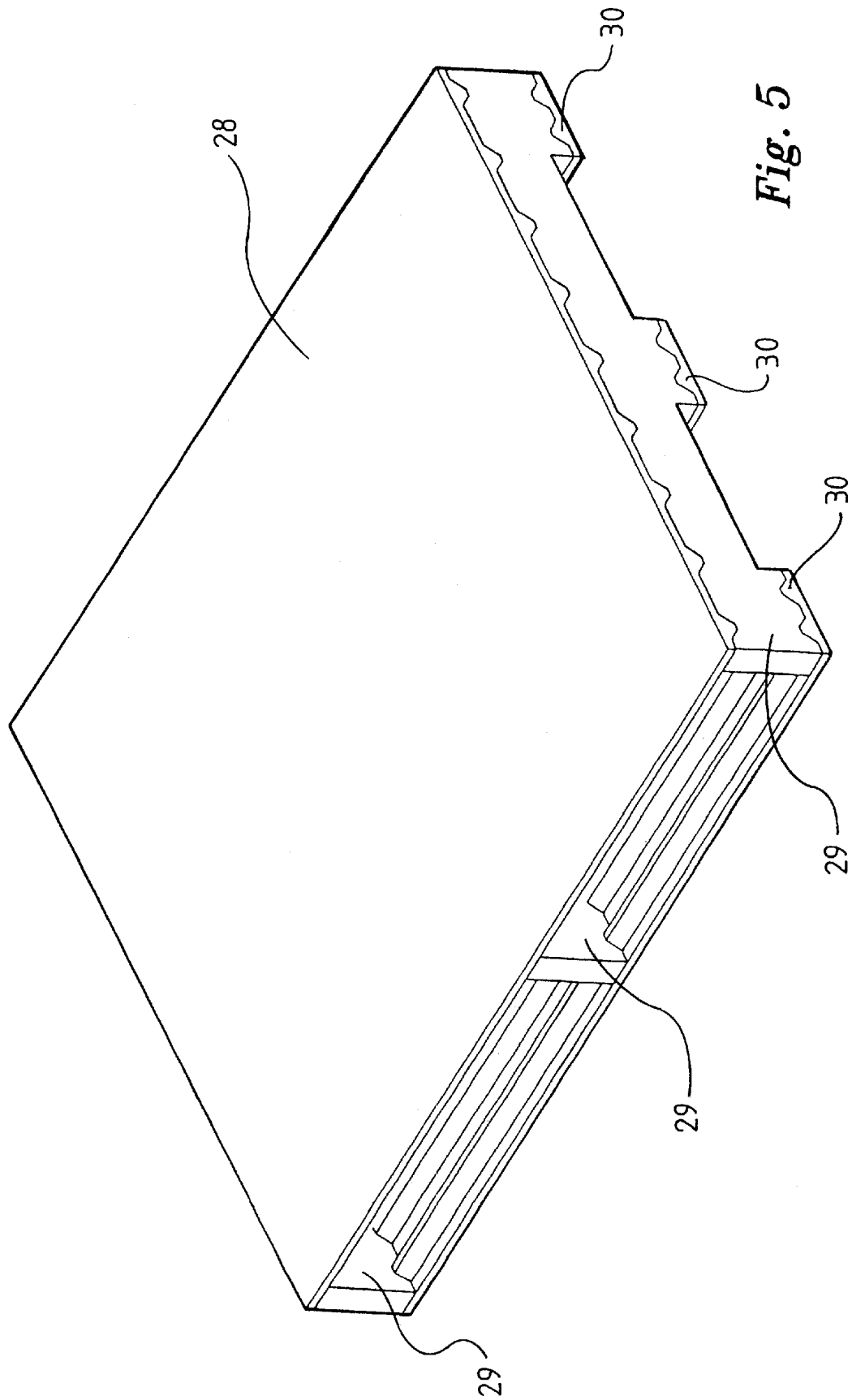
Figure 6:
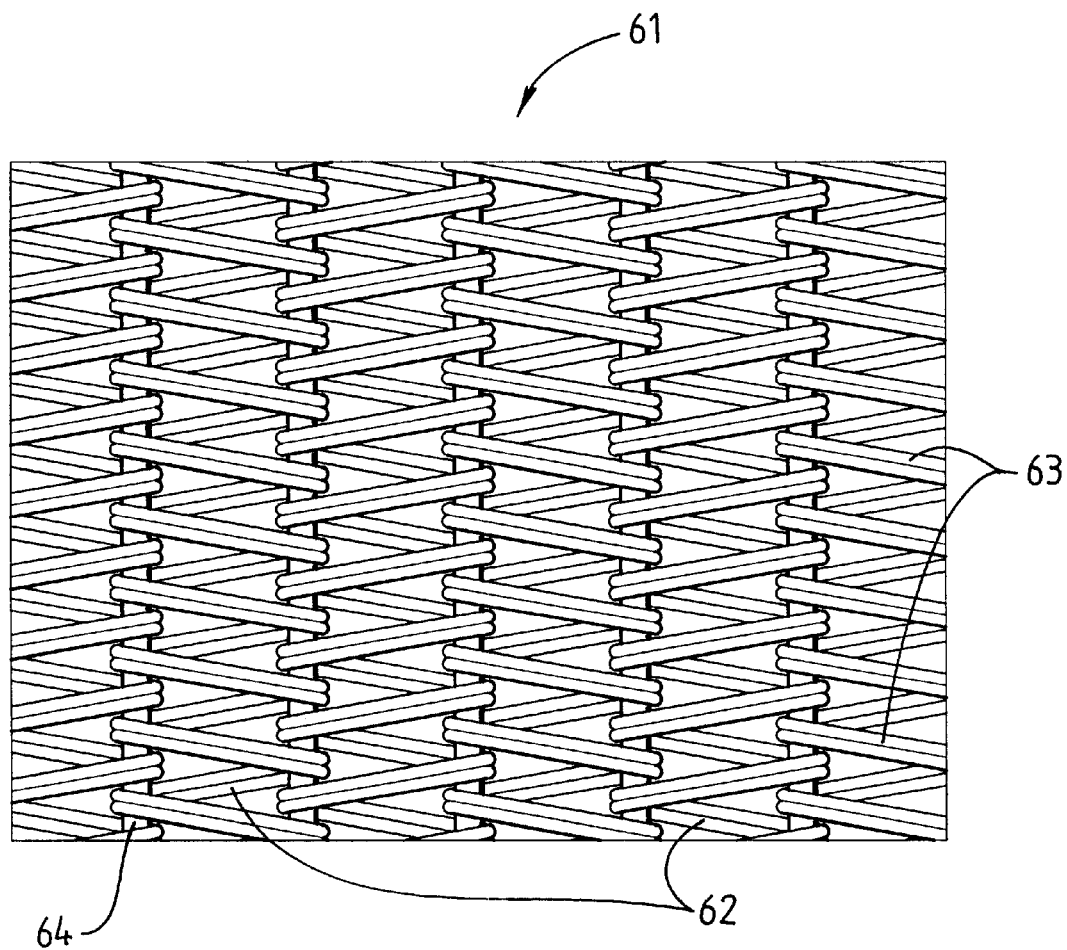

FIG. is a schematic drawing of a pallet fabricated using the top deck of FIG. 3a;

FIG. 5 is a schematic drawing of an extruded top deck of a pallet which is flat on one side and profiled on the other and is illustrated after being fabricated into a similar pallet to that of FIG. 4; and FIG. 6 is an illustration of balanced weave wire mesh which is suitable for use in belts under this invention.

DETAILED DESCRIPTION OF THE PREFERRED EMBODIMENTS

Referring to FIGS. 1 and 1a there is shown the die body 1 of an extruder provided with extrusion die lips 3 and a die mandrel 2 located between the lips. The extrusion die is arranged to direct molten extrudate into the forming machinery which takes the form of two recirculating sizing belts or bands 4 and 5. It is noted that the recirculating belts or bands include channels 4a and 5a which are complementary when the two belts are in operational mode in close proximity to each other 1e the hills and valleys in the respective belts cooperate to produce the corrugated profile shown between the rollers in FIG. 1a.

It is to be appreciated that belts and die have been separated for ease of illustration. In actual operation, the belts will be arranged as close to the outlet of the die as is practical in order to reduce the possibility of extrudate sagging excessively between the die and the recirculating belts.

The belts are tensioned by the tensioning rolls 6 and 8. They are driven through the drive rolls 7 and 9 via the electric motors 11 and 10. The belts themselves are suitably formed of a metallic wire mesh material which is adapted to "stretch" in the longitudinal direction to allow belts to travel around the rolls. However, the construction of the belts is such that they are sufficiently rigid or sufficiently supported in the transverse direction in order to hold their profile shape and hence the extrudate in the preferred shape.

The belts may be kept supported by a plurality of rolls or profiled plates (not shown) provided between the drive and tensioning rolls. Alternatively or additionally, other means such as electromagnets may be employed to ensure that the upper belt, 4 in particular does not sag.

Figure 2A:
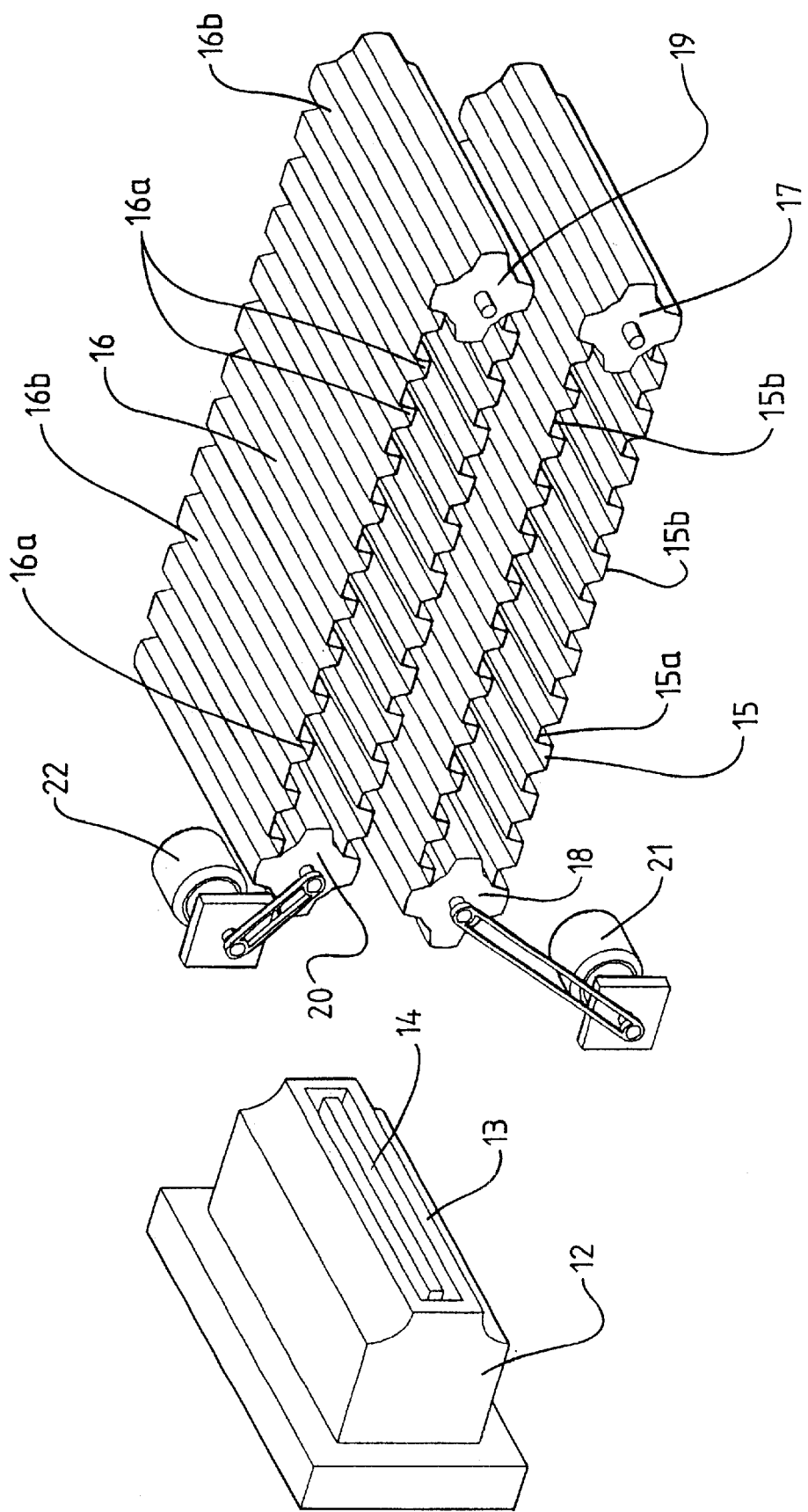
FIG. 2(a) is a schematic diagram of an alternative method of sizing.

Referring to FIG. 2a, there is illustrated an arrangement similar to that shown in respect of FIG. 1 in that an extruder die body 12 is provided with extrusion die lips 13 and a die mandrel 14. The die and mandrel differ from that of FIG. 1 in that they have a linear rather than corrugated cross section. The upper and lower belts 15 and 16 of the forming arrangement include transversely directed channels 15a and 16a. The arrangement of upper and lower belts is such that the profiles of both are complementary in order to effect a transversely corrugated shape in the molten extrudate.

Drive rolls 18 and 20 for the belts 16 and 15 are driven by the respective motors 21 and 22. Similarly, the upper and lower belt include tension rolls 19 and 17 respectively. Furthermore there may be a plurality of intermediate rolls (not shown) to maintain the longitudinal conformation of the two rolls.

The sizing belts may comprise individual elongate longitudinally extending elements which are pivotally attached to each other end to end. Suitably, each of these longitudinal elements will form the floor of one of the channels 15a or 16a. These are pivotally joined to corresponding raised elements 15b and 16b which are themselves separate longitudinal elements. The elongate raised or channel elements will be of a stiff material which serves to hold the extrudate in a defined configuration as it cools. The surface of each of the elements which faces the extrudate is suitably provided with roughening or other form of profiling or a coating to promote adherence between the extrudate and the elements.

Figure 2B:
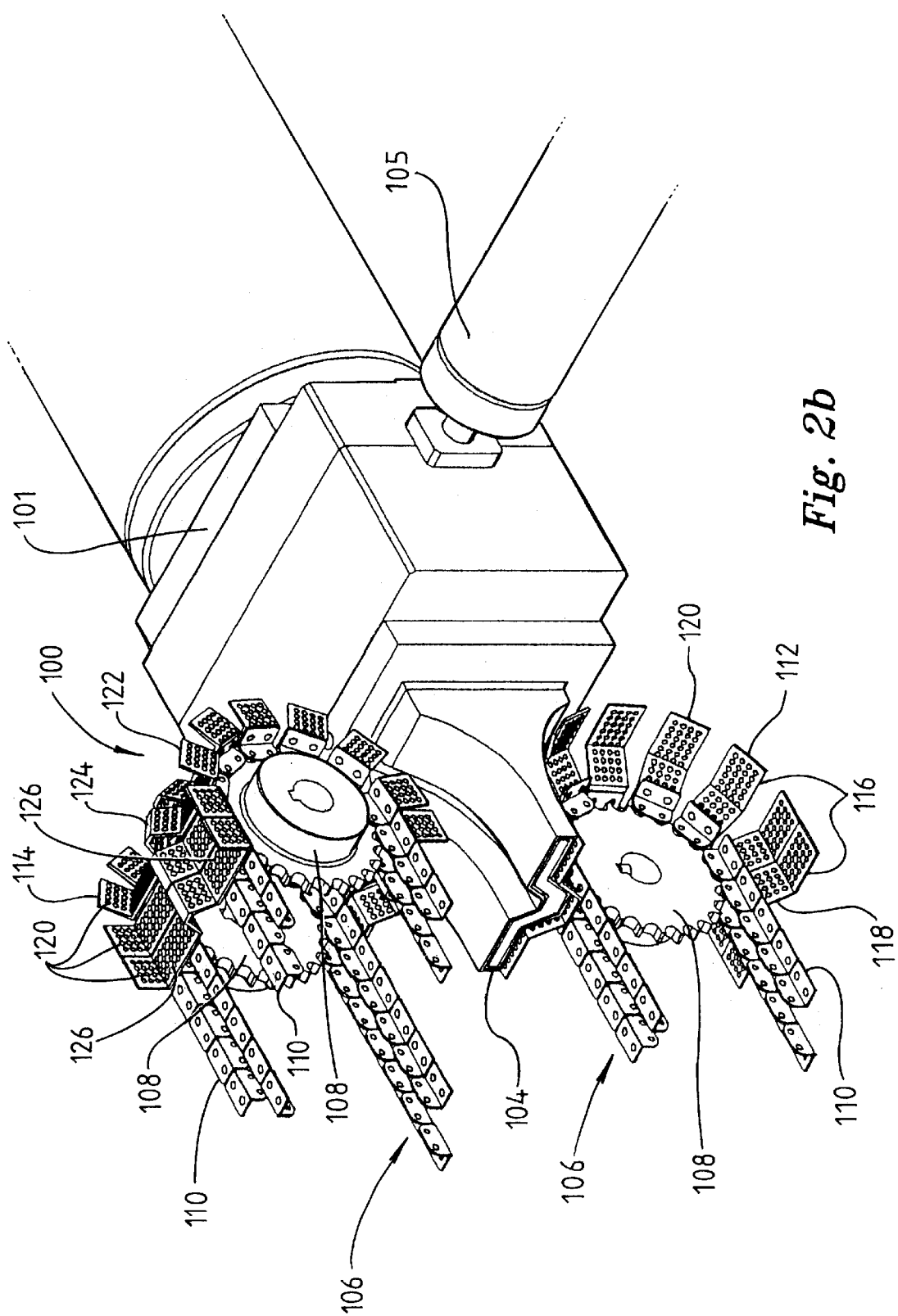
FIG. 2(b) is a schematic diagram of an alternative method of arranging the belts or bands.

Referring to FIG. 2b there is shown an extrusion apparatus 100. It includes an extruder 101 suitable for extruding thermoplastic polymers to form a foamable core. Also shown is extruder 105 suitable for extruding an unfoamed outer skin over a foamed core. Also shown is a co-extrusion die 104. The co-extrusion die 104 is shaped so that it protrudes beyond the point at which the opposing segments of the sizing conveyors 106 have assumed parallel travel in the manner illustrated. The die is shaped so that it corresponds with the complementary profiles of the opposed sizing conveyors 106.

The opposed sizing conveyors include re-circulating chains and "K attachments" 110 (with segments removed for purposes of illustration) which are driven by drive means such as an electric motor, through the sprockets 108. Both the lower and upper chains 110 are used to mount a plurality of lower segments 112 and upper segments 114 respectively. The lower segments include a horizontal portion 116 on either side of the segment joined to a channel portion 118. Both the upper and lower segments include a large number of holes 120 which assist in adherence and in cooling of the extrudate.

The upper segments include an upstanding portion 122 on either side of the segments joined by two horizontal portions 126 which have a channel portion 124 attached to and provided there between.

The upper and lower segments may be joined to the respective chains 110 by any suitable means such as welding, gluing, bolting, snap fitting etc. They may be formed of any suitable material which can withstand the temperatures associated with extrusion and moulding of thermoplastics materials. In a preferred aspect, they will be formed of a suitable metal such as steel which may have been formed from flat sheet by a stamping and cutting step. Alternatively they may be produced by any suitable casting or moulding process for metal or plastic. However it is important that the material of the upper and lower segments be one which has a surface capable of forming a sufficiently strong adherence with the flowable extrudate emanating from the co-extrusion die 104 to be able to maintain the shape of the extrudate in the configuration set by the opposed conveyors 106 until such time as the extrudate has cooled sufficiently until it solidifies and its shape is set in the configuration set by the conveyors.

The adherence between the extrudate and the surfaces of the opposed conveyors formed by the segments, whilst it should be sufficient to maintain the extrudate in its appropriate shape against shrinkage or any other factors until it is cooled, should be one which allows relatively easy removal of the extrudate at the outlet end of the conveyors. The fact that the conveyors recirculate and therefore move away from the extrudate should be sufficient to break any connection there between so that the solidified extrudate simply exits from the assembly of conveyors without requiring any special steps for separation.

Referring to FIG. 3a an unformed thermoplastics extrusion 35 is of a shape which may have been formed by the extrusion and shaping machinery shown with regard to either FIG. 1, FIG. 2a or FIG. 2b, and cut to size. It includes a corrugated profile which serves to reduce weight while maintaining strength. The profile is formed of longitudinally extending channels 36 and peaks 37.

Figure 3B:
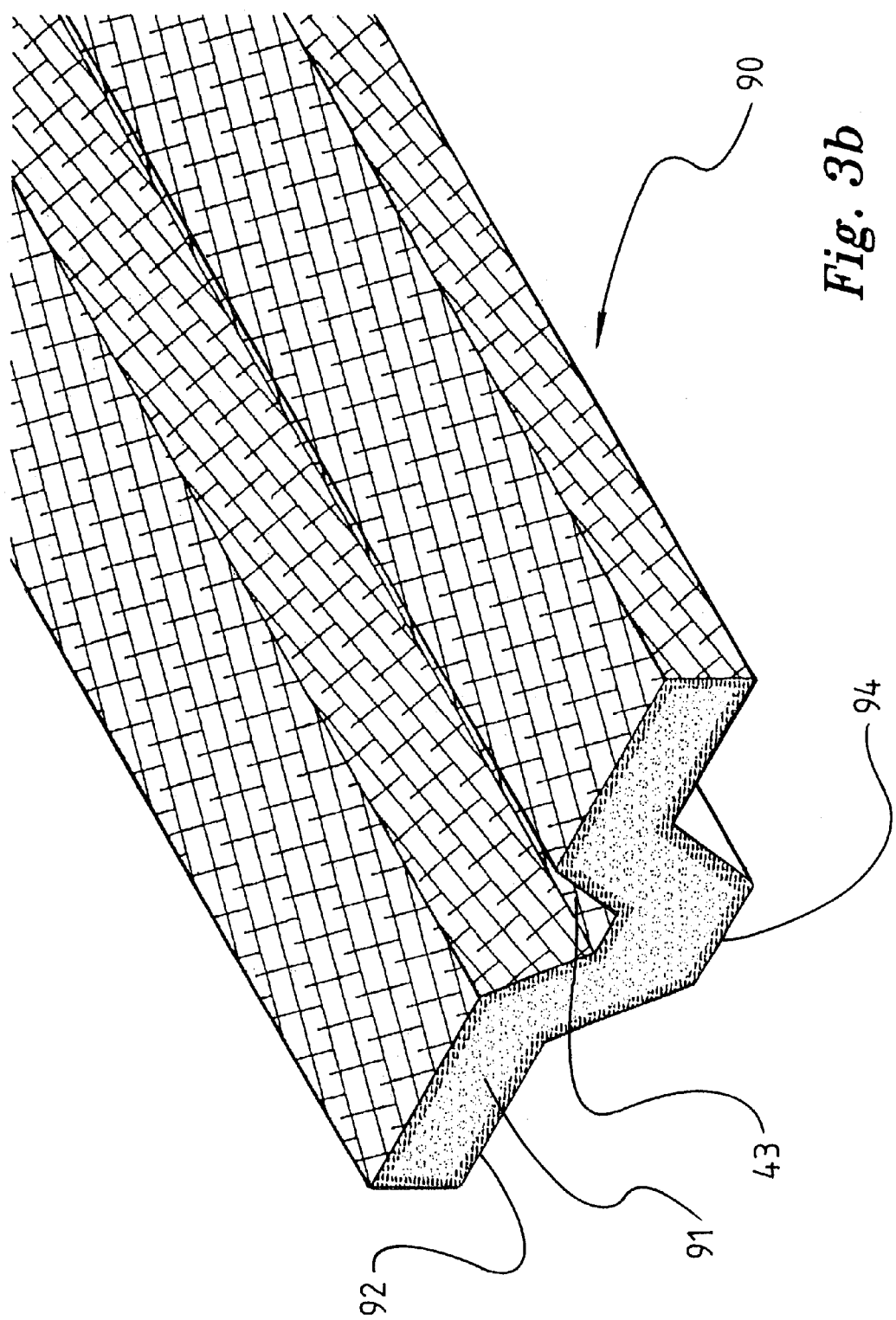
FIG. 3(b) is schematic drawing of an extruded section with a foamed core.

FIG. 3b shows an approach for increasing strength and/or reducing weight even further by forming a foamed thermoplastic core 91 in the profiled extruded product 90. As the foamed core represents a substantial part of the bulk of the product its overall density is relatively low. The foam is surrounded by an unfoamed skin layer 92 of a reinforced thermoplastics material containing eg fiberglass to improve strength. The thickness of the skin layer will generally be in the range 0.5mm to 3mm. The polymeric material of the foamed core may be the same polymeric material as that contained in the unfoamed skin in some instances.

However, depending upon the properties required of the skin, in many instances the polymeric material of the skin may be different to that in the core which then requires that the skin polymeric material is suitably modified to show sufficient compatibility with the core material or a tie layer is employed to permit sufficient bonding between the layers.

The product includes channel 43 and complementary nib 94 to improve rigidity. The product 90 is most suitably produced by a co-extrusion process which uses machinery of the type described with reference to FIG. 2b in particular because of the relatively narrow width as illustrated but this is only a matter of the scale of the machinery employed particularly the co-extrusion die width. Referring to FIG. 4, the pallet illustrated includes a top deck 25 joined to three stringers 26 having profiles complementary to the top deck of the pallet and in turn joined to bottom planks 27. The top deck is formed of a thermoplastics foamed core surfaced with unfoamed thermoplastics skin on top and bottom surfaces.

In a preferred form the core material is a mixture of 70 to 99% HDPE, 0 to 28% LDPEp1 and 0.8 to 2% talc. To the total is added 0.1 to 1% of a physical blowing agent. The skin material consists of 20 to 40% coupled glass fibre reinforced PP mixed in equal proportions with a compound of 20 to 40% coupled glass fibre reinforced HDPE. The thickness of the skin on both sides is about 1 mm, and the foamed core is about 13 mm thick. The depth of the profile from top to bottom ie the beam depth, is 33 to 40 mm. Whilst it is preferred that the top deck for the pallets shown in FIGS. 4 and 5 is manufactured by the process of the invention described herein it is to be understood that top decks manufactured by other processes may also be suitable for manufacturing pallets in accordance with this aspect of the invention.

Referring to FIG. 5 there is illustrated a pallet having a top deck 28 with a flat top and a profiled underside with ribs and channels formed there between. The top deck 28 is joined to three stringers 29 having complementary profiles and these are in turn joined to three complementary profiled thermoplastics planks 30. The join is by welding, gluing, staples or nails or any suitable combination of these. In the pallets shown in FIGS. 4 and 5, the respective members are preferably joined together by heat welding along the length of the stringers 29 to provide a strong and rigid pallet.

During operation of the schematic arrangement of FIG. 1, plastics melt is fed to the extrusion die 1 and hence between the die lips and mandrel 2 and 3. Preferably this is co-extruded with a skin material exhibiting a high value of Young's Modulus typically in excess of 2500 Mpa. The die lips are shown with a separation from the sizing belts or bands for purposes of illustration, however they would normally be disposed in close proximity or even entering those belts or bands. The molten extrudate is sufficiently adhered to the belts or bands 4 and 5, assisted by internal pressure within the extrudate preferably due to foaming, combined with an appropriate speed of the belts or bands. The same mechanism forms or sizes the extrudate between the complementary shaped belts with those belts or bands resisting the outward pressure of the foaming. At the same time the product is cooled and hauled away by the moving belts or bands.

Similarly in schematic arrangement FIG. 2(a), plastics melt is fed to the extrusion die 12 and hence between the die lips and mandrel 13 and 14. Preferably this is co-extruded with a skin material exhibiting a high value of Young's Modulus. The die lips are shown with a separation from the sizing belts or bands 15 and 16 for purposes of illustration, however they would normally be disposed in close proximity to those belts or bands. The belts or bands employed in schematic arrangement 2(a) may be similar to corrugated lion sheets and are so disposed to form a space between those two belts or bands. The molten extrudate is sufficiently adhered to the belts or bands 15 and 16 assisted by internal pressure within the extrudate preferably due to foaming, combined with an appropriate speed of the belts or bands. The same mechanism forms or sizes the extrudate between the complementary shaped belts with those belts or bands resisting the outward pressure of the foaming hence sizing or calibrating the product. At the same time the product is cooled and hauled away by the moving belts or bands.

It is preferred to produce the top deck of a pallet by any of methods as illustrated with respect to FIGS. 1 or 2(a) or 2(b). However, it is to be understood that pallets manufactured with top decks produced by alternative methods may also be suitable. Furthermore the preferred materials of construction for the top deck are foamed high-density polyethylene surrounded with a co-extruded skin of glass fibre reinforced polypropylene which has been modified in order to enhance its ability to adhere to high-density polyethylene. If a reinforcement such as glass fibre is employed it is preferred to produce the pallet top deck using the method illustrated in FIG. 1 or 2(b), both of which tends to orient the fibres in a direction along the 01 "corrugations" thus having maximum strength in that desired direction. Stringers when employed may be made from high-density polyethylene or polypropylene copolymer. These stringers may be extruded, thermoformed from sheet, rotationally cast, blow moulded or preferably injection moulded. The bottom planks may be extruded from high-density polyethylene foam coated with glass or mineral reinforced polypropylene which has been modified in order to enhance its ability to adhere to high-density polyethylene. Those planks may also be cut from product extruded for top deck use. Preferably the stringers and base planks are injection moulded in one piece. The preferred method of joining the various components is by hot plate welding in order that strong bonding may be created of the components with each other. In this manner a high degree of load sharing can occur with other members of the structure when stress is applied to the pallet. In a preferred form of this invention a pallet manufactured in this manner exhibits a decrease in deflection under load by a factor of at least sixfold compared with that deflection which occurs with the same load under the same loading conditions, on that same top deck by itself, ie if the top deck were not welded into the structure of a pallet of the type here illustrated.

When the stringers and the base planks are eg injection moulded, the plastics raw material used for such moulding may optionally contain fillers and/or reinforcements where required. These may be employed to enhance eg the impact performance or to more closely approach the expansion contraction characteristics of the top deck component.

Referring to FIG. 6, the section of wire mesh 61 shown consists of somewhat flattened wire spirals in both right hand and left hand configurations which are joined in alternative right and left hand configurations 62 and 63 by a crimped wire 64 (unseen) which is locked at each of it's lateral ends (unseen). Thus substantial "stretch" can only occur in the longitudinal direction.

While it has been convenient to describe the invention herein in relation to particularly preferred embodiments, it is to be appreciated that other constructions and arrangements are considered as falling within the scope of the invention. Various modifications, alterations, variations and/or additions to the constructions and arrangements described herein are also considered as falling within the scope and ambit of the present invention.

What is claimed is:

1. A method of producing an elongate calibrated extrusion of a formable material including the steps of:
   (i) extruding the formable material to form a flowable extrudate,
   (ii) directing the flowable extrudate through a calibrator having an internal forming surface which moves at sufficient speed to allow it to continuously take up the flowable extrudate, wherein said forming surface is adapted such that the flowable extrudate will tend to adhere to it,
   (iii) causing the flowable extrudate to adhere sufficiently to the internal forming surface to maintain the shape of the flowable extrudate in conformance with the forming surface until the flowable extrudate has solidified sufficiently to maintain its shape without external support; and
   (iv) detaching the solidified extrudate from the internal forming surface.

2. A method according to claim 1 wherein the calibrator includes opposed sizing conveyors which jointly provide at least part of the internal forming surface.

3. A method according to claim 1 wherein the calibrator includes opposed sizing conveyors which are each provided with recirculating belts, bands, or multiple segments.

4. A method according to claim 3 wherein at least one of the sizing conveyors includes a recirculating wire mesh belt or chain mesh belt with wire centres of the mesh being no larger than 6 mm×4.5 mm.

5. A method of producing an elongate calibrated extrusion of a formable material including the steps of:
   (i) extruding the formable material to form a flowable extrudate,
   (ii) directing the flowable extrudate through a calibrator having an internal forming surface which moves at sufficient speed to allow it to continuously take up the flowable extrudate, wherein said forming surface is adapted such that the flowable extrudate will tend to adhere to it,
   (iii) causing the flowable extrudate to adhere sufficiently to the internal forming surface to maintain the shape of the flowable extrudate in conformance with the forming surface until the flowable extrudate has solidified sufficiently to maintain its shape without external supports, and
   (iv) detaching the solidified extrudate from the internal forming surface, wherein the calibrator includes opposed sizing conveyors which are each provided with recirculating belts, bands, or multiple segments; and at least one of the sizing conveyors includes a recirculating wire mesh belt or chain mesh belt with wire centers of the mesh being no larger than 6 mm×4.5 mm.

6. A method according to claim 2 or 5 wherein the internal forming surface is profiled.

7. A method according to claim 3 or 5 wherein the belt, band or multiple segments are profiled to form or maintain one or more ribs on the solidified extrudate.

8. A method according to claim 7 wherein the one or more ribs extend along the direction of travel of the recirculating belts, bands or multiple segments.

9. A method according to claim 7 wherein the solidified extrudate is corrugated.

10. A method according to claim 7 wherein the solidified extrudate includes a plurality of ribs.

11. A method according to claim 1 or 5 wherein the formable material includes a thermoplastic polymer.

12. A method according to claim 11 wherein the thermoplastics polymer has a melt up to 0–300 or an IV For PET and it's copolymers of as low as 50.

13. A method according to claim 11 wherein the thermoplastics polymer includes a polyolefin.

14. A method according to claim 11 wherein the thermoplastic polymer is selected from the group consisting of PET, PBT, PE, polyamides and copolymers thereof, and mixtures of two or more of these thermoplastic polymers.

15. A method according to claim 1 or 5 wherein the flowable extrudate includes means for foaming the core of the extrudate.

16. A method according to claim 15 wherein the flowable extrudate is provided with an unfoamed skin.

17. A method according to claim 16 wherein the unfoamed skin surrounds the flowable extrudate.

18. A method according to claim 16 wherein the unfoamed skin material includes sufficient reinforcing material to at least double the Young's Modulus of the skin material compared with its non-reinforced counterpart.

19. A method according to claim 1 or claim 5 wherein the adaptation of the forming surface includes pre-heating.

20. A method according to claim 1 or claim 5 wherein the adaptation of the forming surface includes roughening by means which may include sandblasting.

21. A method of producing an elongate calibrated extrusion of a formable material including the steps of:
   (i) extruding the formable material to form a flowable extrudate,
   (ii) directing the flowable extrudate through a calibrator having an internal forming surface which moves at sufficient speed to allow it to continuously take up the flowable extrudate, and
   (iii) causing the flowable extrudate to adhere sufficiently to the internal forming surface to maintain the shape of the flowable extrudate in conformance with the forming surface until the flowable extrudate has solidified sufficiently to maintain its shape without external support and detaching the solidified extrudate from the internal forming surface, wherein the flowable extrudate includes means for foaming the core of the extrudate, said flowable extrudate is provided with an unfoamed skin such that the unfoamed skin surrounds the flowable extrudate and the unfoamed skin material includes sufficient reinforcing material to at least double the Young's Modulus of the skin material compared with its non-reinforced counterpart.

22. A method according to claim 16 or 21 wherein the Young's Modulus of the co-extruded composite structure is at least quadrupled.

23. A method according to claim 16 or 21 wherein the reinforcing material includes any one or more of the group consisting of glass fibre, carbon fibre, aramid fibre, naturally occurring fibres, talc, mica, metal carbonates, silica, wollastonite, clays and glass spheres.

24. A method according to claim 3, 5 or 21 wherein the temperature of the extrudate between the recirculating belts is controlled using air blowers.

25. A method according to claim 3, 5 or 21 wherein the formable material is extruded through a die which protrudes between opposed recirculating multiple segments.

26. A method according to claim 15 or 21 wherein one or more edges of the extrudate are machined or otherwise treated to produce an edge or face which exposes the core material and the exposed core material is treated with heat to seal the core material.

27. A method according to claim 2, 5 or 21 wherein the flowable extrudate is fed downwards between opposed sizing conveyors extending vertically or in a downward direction which lies between the vertical and the horizontal.

28. A method according to claim 2, 5 or 21 wherein edges of the flowable extrudate between the opposed sizing conveyors are contained by using dynamic containment means including any one or more of rollers, roller chains or belts.

29. A method according to claim 28 wherein the containment means includes a roller chain extending lengthwise on each side between the belts.

30. A solidified extruded product produced by the method of claim 5 or 21.

31. A solidified extruded product according to claim 30 wherein the product is formed of a thermoplastics polymeric material and has one or more reinforcing ribs.

32. A solidified extrudate product according to claim 31 wherein the extruded product has a foamed core and has an unfoamed surface skin.

33. A solidified extruded product according to claim 32 wherein the surface skin is a thermoplastics polymeric material provided with sufficient reinforcing material to at least quadruple the Young's Modulus of the extruded product.

34. A solidified extruded product according to claim 33 wherein the reinforcing material is chosen from any one or more of the group consisting of glass fibre, carbon fibre, aramid fibre, naturally occurring fibres, wollastonite, talc, mica, metal carbonates, clays and glass spheres.

35. A solidified extruded product according to claim 34 having one of the structures of the group consisting:
(i) glass fibre reinforced polypropylene or its copolymers as the skin material, co-extruded over foamed polypropylene or its copolymers,
(ii) glass fibre reinforced high density polyethylene as the skin material, co-extruded over foamed high density polyethylene,
(iii) glass fibre reinforced polypropylene or its copolymers as the skin material with a tie layer chosen from ionomer resin, copolymers of acrylic acid and ethylene vinyl acetate and a co-extruded core of foamed high density polyethylene, and
(iv) fibre and/or particulate mineral reinforced polypropylene or its copolymers which has been modified to exhibit improved compatibility with high-density polyethylene, co-extruded over a foamed high density polyethylene core.

36. A pallet produced by the method according to claim 1, 5 or 21 of having a top deck which has a cross sectional profile including a plurality of elongate channel shaped sections, the channels having a depth which is equal to or greater than one quarter of the depth of the top deck, the top deck being formed of thermoplastics material having an unfoamed skin formed on one or both sides of the top deck and having a foamed core.

37. A pallet according to claim 36 wherein the unfoamed skin is a thermoplastics polymer which incorporates sufficient reinforcing material to at least double the Young's Modulus of the skin material compared with that of its non-reinforced counterpart.

38. A pallet according to claim 37 wherein the reinforcing material is chosen from any one or more of the group consisting of glass fibre, carbon fibre, aramid fibre, naturally occurring fibres, talc, mica, metal carbonates, silica, wollastonite, clays and glass spheres.

39. A pallet according to claim 36 including at least two stringers upon which the top deck is mounted, the stringers running generally perpendicular to the channels on the top deck, two of the stringers extending along either side of the top deck, the upper sides of the stringers being shaped to complement the profile of the underneath of the top deck where it is mounted on the respective stringer.

40. A pallet according to claim 39 including two or more planks joined to the bottom of the stringers and running generally parallel to the channel sections.

41. A pallet according to claim 40 including a third stringer extending centrally under the top deck.

42. A pallet according to claim 40 wherein the two or more planks are formed of thermoplastics material and have a cross-sectional profile including one or more elongate channels.

43. A pallet according to claim 39 wherein the stringers are moulded or formed with one or more base members joining the stringers as an integral one piece assembly of thermoplastics material.

44. A thermoplastics pallet according to claim 39 having a top deck which has been manufactured according to the method of claim 21 and meets the requirements for a minimum of one tonne rating under ISO/DIS8611 Plastics Pallets for Materials Handling.

45. A rectangular 1200×1000 mm pallet according to claim 36 including three stringers wherein the top deck has the following characteristics:
(i) 7 to 12 corrugations on each side,
(ii) a total beam depth of 33 mm to 40 mm,
(iii) a foamed core thickness of 12 to 15 mm core including 70% to 98% by weight HDPE, 0 to 28% by weight LDPE, and 0.8% to 2% talc, to which total is added up to 1% by weight physical blowing agent, and
(iv) an average skin thickness in the range 1.0 to 1.25 mm, the skin material consisting of a compound of 30 to 40% coupled glass fibre reinforced HDPE; or a compound of 30 to 40% coupled glass fibre reinforced PP mixed with 30 to 35% HDPE.

46. Apparatus when used for performing the method of claim 1, claim 5 or claim 21 including, an extruder for thermoplastic material, and a calibrator arranged to receive and size the extrudate from the extruder, the calibrator having a pair of opposed sizing conveyors, at least one of said opposed sizing conveyors including a recirculating mesh belt maintained in a profiled shape in order to form or maintain one or more ribs in the extrudate, said one or more ribs extending the direction of recirculation of said recirculating mesh belt.

47. Apparatus according to claim 46 wherein each of the pair of opposed sizing conveyors includes a profiled mesh belt, the profiling on the opposed mesh belts being complementary to form or maintain a corrugated effect on solidified extruded product produced by the apparatus.

48. Apparatus according claim 46 having containment means for containing the edges of flowable extrudate between the opposed sizing conveyors, the containment means including any one or more of rollers, roller chains or belts.

49. Apparatus according to claim 48 wherein the containment means include a roller chain extending lengthwise on each side between the belts.

* * * * *

UNITED STATES PATENT AND TRADEMARK OFFICE
CERTIFICATE OF CORRECTION

PATENT NO. : 6,659,020 B1
DATED : December 9, 2003
INVENTOR(S) : Ball

It is certified that error appears in the above-identified patent and that said Letters Patent is hereby corrected as shown below:

Column 4,
Line 13, "present forming" should read -- prevent foaming --.

Column 5,
Line 41, "die" should read -- the --.

Column 8,
Line 16, "polyanuides" should read -- polyamides --.
Line 63, "polyarnides" should read -- polyamides --.

Column 12,
Line 18, "endothemic" should read -- endothermic --.
Line 43, "sufficient" should read -- insufficient --.

Column 13,
Line 53, "forming" should read -- foaming --.

Columns 16, line 46 - Column 17, line 31,
Should be deleted.

Column 18,
Line 53, "finer" should read -- filler --.

Column 19,
Line 4, "LTV" should read -- UV --.
Line 17, "le" should read -- ie --.
Line 51, the second appearance of the word "friction" should read -- functions --.
Line 52, "and" should read -- anti --.
Line 65, "bps" should read -- lips --.

Column 22,
Line 45, "le" should read -- ie --.

Column 24,
Note 1., the second line "AD" should read -- All --.

Column 27,
Line 25, "le" should read -- ie --.

UNITED STATES PATENT AND TRADEMARK OFFICE
CERTIFICATE OF CORRECTION

PATENT NO.   : 6,659,020 B1
DATED        : December 9, 2003
INVENTOR(S)  : Ball

It is certified that error appears in the above-identified patent and that said Letters Patent is hereby corrected as shown below:

Column 28,
Line 66, "unformed" should read -- unfoamed --.

Column 29,
Line 24, "nib" should read -- rib --.
Line 38, "LDPEp1" should read -- LDPE --.

Column 30,
Line 20, "lion" should read -- iron --.
Line 42, "01" should be deleted. This has just somehow appeared in the text!

Column 32,
Line 21, "melt" should read -- melt index --.

Column 34,
Line 5, "of" should be deleted.

Signed and Sealed this

Twenty-second Day of June, 2004

JON W. DUDAS
*Acting Director of the United States Patent and Trademark Office*